United States Patent
Sim et al.

(10) Patent No.: US 12,466,812 B2
(45) Date of Patent: Nov. 11, 2025

(54) PYRIDINYLTRIAZINE DERIVATIVE HAVING PROTEIN KINASE INHIBITORY ACTIVITY, AND PHARMACEUTICAL COMPOSITION FOR PREVENTING, AMELIORATING, OR TREATING CANCER COMPRISING SAME

(71) Applicant: KOREA INSTITUTE OF SCIENCE AND TECHNOLOGY, Seoul (KR)

(72) Inventors: Tae Bo Sim, Seoul (KR); Seong Shick Ryu, Seoul (KR); Yun Ju Nam, Seoul (KR); Woo Young Hur, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 735 days.

(21) Appl. No.: 17/770,630

(22) PCT Filed: Oct. 22, 2020

(86) PCT No.: PCT/KR2020/014491
§ 371 (c)(1),
(2) Date: Apr. 21, 2022

(87) PCT Pub. No.: WO2021/080346
PCT Pub. Date: Apr. 29, 2021

(65) Prior Publication Data
US 2023/0027716 A1    Jan. 26, 2023

(30) Foreign Application Priority Data
Oct. 24, 2019 (KR) .................. 10-2019-0132662

(51) Int. Cl.
| | | |
|---|---|---|
| C07D 403/12 | (2006.01) | |
| A61P 35/00 | (2006.01) | |
| C07D 401/04 | (2006.01) | |
| C07D 401/14 | (2006.01) | |
| C07D 405/14 | (2006.01) | |
| C07D 413/14 | (2006.01) | |

(52) U.S. Cl.
CPC ............ C07D 403/12 (2013.01); A61P 35/00 (2018.01); C07D 401/04 (2013.01); C07D 401/14 (2013.01); C07D 405/14 (2013.01); C07D 413/14 (2013.01)

(58) Field of Classification Search
CPC ..... A61K 31/53; A61K 31/5377; A61P 35/00; C07D 401/04; C07D 401/14; C07D 403/12; C07D 403/14; C07D 405/14; C07D 413/14
See application file for complete search history.

(56) References Cited

U.S. PATENT DOCUMENTS

| | | | |
|---|---|---|---|
| 5,215,569 A | 6/1993 | Drewes et al. | |
| 2004/0116388 A1* | 6/2004 | Armistead | C07D 413/14 514/84 |
| 2007/0293484 A1 | 12/2007 | Guan et al. | |

FOREIGN PATENT DOCUMENTS

| | | | | |
|---|---|---|---|---|
| KR | 10-2013-0006632 A | 1/2013 | | |
| KR | 10-2014-0099904 A | 8/2014 | | |
| KR | 10-1850282 B1 | 5/2018 | | |
| KR | 10-1893112 B1 | 8/2018 | | |
| WO | 1999/27921 A2 | 6/1999 | | |
| WO | WO-0125220 A1 * | 4/2001 | ............. A61P 35/04 | |
| WO | 2007-042806 A1 | 4/2007 | | |
| WO | 2014/144737 A1 | 9/2014 | | |

OTHER PUBLICATIONS

Meanwell, Fluorine and Fluorinated Motifs in the Design and Application of Bioisosteres for Drug Design; Journal of Medicinal Chemistry, 61, 5822-5880 (Year: 2018).*
Vito Guagnano et al., "Discovery of 3-(2,6-Dichloro-3,5-dimethoxyphenyl)-1-{6-[4-(4-ethyl-piperazin-1-yl)-phenylamino]-pyrimidin-4-yl}-1-methyl-urea (NVP-BGJ398), A Potent and Selective Inhibitor of the Fibroblast Growth Factor Receptor Family of Receptor Tyrosine Kinase," Journal of Medicinal Chemistry, 2011, pp. 7066-7083, American Chemical Society.
International Search Report mailed Feb. 2, 2021 for PCT/KR2020/014491.

* cited by examiner

Primary Examiner — Jeffrey H Murray
Assistant Examiner — Daniel John Burkett
(74) Attorney, Agent, or Firm — CANTOR COLBURN LLP

(57) ABSTRACT

The present invention relates to: a compound selected from among a novel pyridinyltriazine derivative having protein kinase inhibitory activity, a pharmaceutically acceptable salt thereof, a hydrate thereof, or a stereoisomer thereof; a method for preparing the compound; and a pharmaceutical composition which is for preventing, alleviating, or treating cancer and comprises the compound. A novel compound according to the present invention exhibits excellent inhibitory effects against FGFR, which is a major trigger of bladder cancer, endometrial cancer, etc., point mutations thereof, and various protein kinases other than FGFR involved in signal transduction, and is thus effective as an agent for preventing and treating abnormal cell growth diseases caused by such protein kinases.

9 Claims, 1 Drawing Sheet

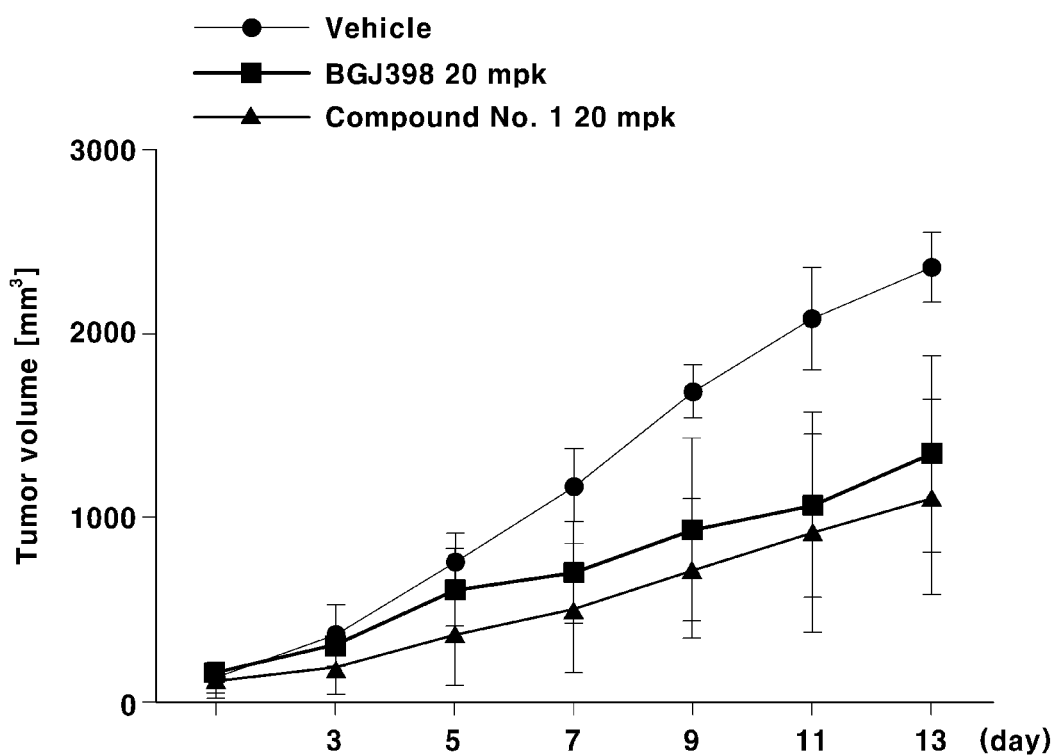

PYRIDINYLTRIAZINE DERIVATIVE HAVING PROTEIN KINASE INHIBITORY ACTIVITY, AND PHARMACEUTICAL COMPOSITION FOR PREVENTING, AMELIORATING, OR TREATING CANCER COMPRISING SAME

TECHNICAL FIELD

The present invention relates to a compound selected from novel pyridinyl triazine derivatives having inhibitory activity against protein kinase, pharmaceutically acceptable salts thereof, hydrates thereof, and stereoisomers thereof, a method of preparing the compound, and a pharmaceutical composition for preventing, alleviating or treating cancer containing the compound as an active ingredient.

BACKGROUND ART

Disclosure

Fibroblast growth factor receptors (FGFR) are a family of receptor tyrosine kinases consisting of four subtypes and include three extracellular ligand-binding domains, a hydrophobic membrane domain, and an intracellular tyrosine kinase domain. Fibroblast growth factors and their receptors closely relate to cell growth, cell differentiation, cell migration, and cell survival, and amplified fibroblast growth factor receptor-mediated signaling and active mutations have been observed in numerous carcinomas. Amplified FGFR1 has been often reported in non-small cell lung cancer and hormone-receptor-positive breast cancer. Amplified and mutated FGFR2 has also been reported in about 10% of gastric cancer cases, 4% of bacterial breast cancer cases, and 10% of endometrial cancer cases. Finally, mutated FGFR3 was found in about half of bladder cancer cases. In addition, multiplex sequencing technology revealed that mutation and amplification of FGFR relate to cancer cell proliferation, resistance to anticancer therapy, and angiogenesis.

Therefore, inhibiting the FGF/FGFR signaling system for anticancer therapy is currently very important in the development of kinase-based targeted anticancer drugs. There are many non-selective (multi-kinase) FGFR inhibitors currently undergoing clinical trials. These FGFR inhibitors have low selectivity, so it is difficult to pharmacologically determine the anticancer mechanism based on FGFR inhibition. Therefore, there is an urgent need to develop novel FGFR inhibitors with selectivity and high activity.

Meanwhile, J. Med. Chem. (2011, 54:7066-7083) discloses that a 3-(2,6-dichloro-3,5-dimethoxyphenyl)-1-6-[4-(4-ethyl-piperazin-1-yl)phenylamino]pyrimidine-4-yl-1-methyl urea compound has selective inhibitory activity against FGFR3 and exhibits effective anticancer activity against the RT112 bladder cancer cell line.

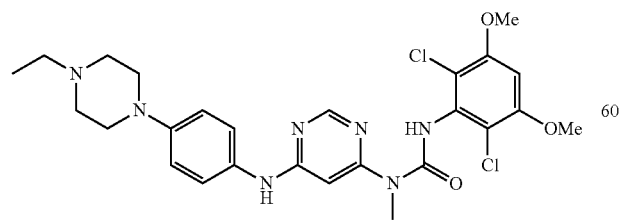

NVP-BGJ398

Various compounds having a basic parent nucleus of 1,3,5-triazine-2-amine have been synthesized to date, but there has been no report of a pyridinyl triazine derivative compound, which is the main feature of the present invention. Furthermore, there is no document disclosing that the pyridinyl triazine derivative compound of the present invention has inhibitory activity against protein kinase and that the same is thus useful as a prophylactic and therapeutic agent for cancer.

PRIOR ART LITERATURE

Patent Literature (Patent Document 1) Korean Patent No. 10-1850282

Non-Patent Literature (Non-Patent Document 1) J. Med. Chem. 2011, 54, 7066-7083

DISCLOSURE

Technical Problem

It is one object of the present invention to provide a compound selected from a novel pyridinyl triazine derivative having inhibitory activity against protein kinase, a pharmaceutically acceptable salt thereof, a hydrate thereof, a solvate thereof and a stereoisomer thereof.

It is another object of the present invention to provide a pharmaceutical composition for preventing, alleviating or treating cancer containing a compound selected from a novel pyridinyl triazine derivative, a pharmaceutically acceptable salt thereof, a hydrate thereof, a solvate thereof, and a stereoisomer thereof as an active ingredient.

It is another object of the present invention to provide a method of preparing a compound selected from a novel pyridinyl triazine derivative, a pharmaceutically acceptable salt thereof, a hydrate thereof, a solvate thereof, and a stereoisomer thereof.

Technical Solution

In one aspect, the present invention provides a compound selected from a pyridinyl triazine derivative compound represented by the following Formula 1, a pharmaceutically acceptable salt thereof, a hydrate thereof, a solvate thereof, and a stereoisomer thereof:

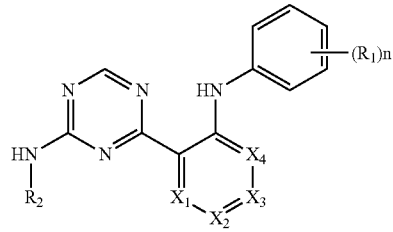

[Formula 1]

wherein
$X_1$, $X_2$, $X_3$ and $X_4$ are each independently N or CH;
$R_1$ is a halogen atom or any one selected from a $C_1$-$C_8$ alkyl group, a $C_1$-$C_8$ alkoxy group, and

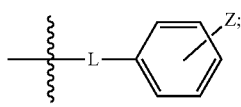

R$_2$ is a halogen atom, a C$_1$-C$_{13}$ alkyl group, a C$_3$-C$_{10}$ cyclic group, a C$_3$-C$_{10}$ aryl group, or a C$_3$-C$_{10}$ heteroaryl group,
  wherein the C$_1$-C$_{13}$ alkyl group or the C$_3$-C$_{10}$ cyclic group contains at least one substituent selected from the group consisting of a hydroxy group, a halogen group, a C$_1$-C$_{13}$ alkyl group, a C$_1$-C$_6$ alkoxy group, an amino group (—NR$_3$R$_4$), a nitro group (—N(O)$_2$), an amide group (—(C=O)NR$_3$R$_4$), a carboxyl group (—C(O)OH), a nitrile group (—CN), a urea group (—NR$_3$(C=O)NR$_4$—), a sulfonamide group (—NHS(O)$_2$—), a sulfide group (—S—), a sulfone group (—S(O)$_2$—), a phosphinyl group (—P(O)R$_3$R$_4$), a C$_5$-C$_{10}$ aryl group, a C$_3$-C$_{10}$ heteroaryl group, and a C$_3$-C$_{10}$ heterocyclic group,
  the C$_3$-C$_{10}$ aryl group or the C$_3$-C$_{10}$ heteroaryl group contains at least one substituent selected from the group consisting of hydrogen, a hydroxy group, a halogen group, a carbonyl group (—(C=O)R$_3$R$_4$), a C$_1$-C$_3$ alkyl group substituted or unsubstituted with halogen or a C$_3$-C$_{10}$ heterocyclic group, a C$_1$-C$_3$ alkoxy group substituted or unsubstituted with halogen or a C$_3$-C$_{10}$ heterocyclic group, a C$_6$-C$_{10}$ phenoxy group, an amino group (—NR$_3$R$_4$), a nitro group (—N(O)$_2$), an amide group (—(C=O)NR$_3$R$_4$), a carboxyl group (—C(O)OH), a nitrile group (—CN), a urea group (—NR$_3$(C=O)NR$_4$—), a sulfonamide group (—NHS(O)$_2$—), a sulfide group (—S—), a sulfone group (—S(O)$_2$—), a phosphinyl group (—P(O)R$_3$R$_4$), a C$_6$-C$_{10}$ aryl group, a C$_3$-C$_{10}$ heteroaryl group, and a C$_3$-C$_{10}$ heterocyclic group,
R$_3$ and R$_4$ described above each independently contain at least one selected from the group consisting of hydrogen, a C$_1$-C$_6$ alkyl group, a C$_1$-C$_6$ alkenyl group, a C$_1$-C$_6$ alkynyl group, a C$_5$-C$_{10}$ aryl group, a C$_3$-C$_{10}$ heteroaryl group, and a C$_3$-C$_{10}$ heterocyclic group,
the C$_3$-C$_{10}$ heteroaryl group contains at least one heteroatom selected from the group consisting of N, O, and S,
L is —NHC(O)— or —C(O) NH—,
Z includes one to four substituents selected from C$_1$-C$_8$ alkyl, C$_1$-C$_8$ haloalkyl, 5-membered or 6-membered heteroaryl containing 1 to 3 nitrogen atoms, and 5-membered or 6-membered heterocycloalkyl containing 1 to 3 heteroatoms selected from nitrogen and oxygen atoms, wherein the heteroaryl or heterocycloalkyl is substituted or unsubstituted with C$_1$-C$_6$ alkyl; and
n is an integer from 0 to 6, wherein, when n is 2 or more, R$_1$ is each independently selected from a halogen atom, a C$_1$-C$_8$ alkyl group, a C$_1$-C$_8$ alkoxy group and

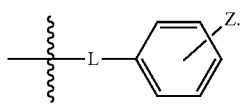

In another aspect, the present invention provides a pharmaceutical composition for preventing, alleviating or treating cancer containing a compound selected from the pyridinyl triazine derivative compound represented by Formula 1, a pharmaceutically acceptable salt thereof, a hydrate thereof, a solvate thereof, and a stereoisomer thereof as an active ingredient.

In another aspect, the present invention provides a method of preparing a compound selected from the pyridinyl triazine derivative compound represented by Formula 1, a pharmaceutically acceptable salt thereof, a hydrate thereof, a solvate thereof, and a stereoisomer thereof.

Advantageous Effects

The compounds of the present invention have excellent ability to inhibit the activity of protein kinase selected from CDK4, CDK6, CLK2, DDR1, FGFR1, FGFR2, FGFR3, FGFR4, FMS, IRAK1, LCK, LYN, MAK, MPSK1, PCTAIRE1, PCTAIRE2, PHKg1, ROS, TAO2, and TRKA, and thus can be used as an active ingredient of pharmaceutical compositions for preventing and treating diseases caused by abnormal cell growth, that is, tumor or cancer diseases.

Therefore, the compound according to the present invention can be used as a prophylactic and therapeutic agent for diseases caused by abnormal cell growth, for example, various cancer diseases selected from endometrial cancer, bladder cancer, stomach cancer, lung cancer, liver cancer, colon cancer, small intestine cancer, pancreatic cancer, brain cancer, bone cancer, melanoma, breast cancer, sclerosing adenosis, head and neck cancer, esophageal cancer, thyroid cancer, parathyroid cancer, kidney cancer, sarcoma, prostate cancer, urethral cancer, leukemia, multiple myeloma, blood cancer such as myelodysplastic syndrome, lymphoma such as Hodgkin's disease and non-Hodgkin's lymphoma, fibroadenoma and the like.

DESCRIPTION OF DRAWINGS

FIGURE is a graph showing the result of evaluation of the anticancer activity in an animal model transplanted with a bladder cancer cell line of Compound No. 1 according to the present invention.

BEST MODEL

Unless the context clearly indicates otherwise, all numbers, figures and/or expressions that represent ingredients, reaction conditions, polymer compositions, and amounts of mixtures used in the specification are approximations that reflect various uncertainties of measurement occurring inherently in obtaining these figures, among other things. For this reason, it should be understood that, in all cases, the term "about" should be understood to modify all numbers, figures, and/or expressions. In addition, when numerical ranges are disclosed in the description, these ranges are continuous and include all numbers from the minimum to the maximum, including the maximum within each range, unless otherwise defined. Furthermore, when the range refers to an integer, it includes all integers from the minimum to the maximum, including the maximum within the range, unless otherwise defined.

It should be understood that, in the specification, when a range is referred to regarding a parameter, the parameter encompasses all figures including end points disclosed within the range. For example, the range of "5 to 10" includes figures of 5, 6, 7, 8, 9, and 10, as well as arbitrary sub-ranges, such as ranges of 6 to 10, 7 to 10, 6 to 9, and 7 to 9, and any figures, such as 5.5, 6.5, 7.5, 5.5 to 8.5, and 6.5 to 9, between appropriate integers that fall within the range.

In addition, for example, the range of "10% to 30%" encompasses all integers, including numbers such as 10%, 11%, 12% and 13% as well as 30%, and any sub-ranges, such as ranges of 10% to 15%, 12% to 18%, or 20% to 30%, as well as any numbers, such as 10.5%, 15.5% and 25.5%, between appropriate integers that fall within the range.

In addition, unless otherwise defined, terms and abbreviations used herein may be interpreted as having meanings commonly understood by those skilled in the art to which the present invention pertains.

Hereinafter, the present invention will be described in detail.

As a result of continuous research to solve the above problems, the present inventors developed a compound selected from pyridinyl triazine derivative compounds useful for the prevention or treatment of cancer as anti-cancer compounds exhibiting excellent inhibitory activity against cancer cells, particularly selective inhibitors for activity of protein kinase and mutant kinase, pharmaceutically acceptable salts thereof, hydrates thereof, solvates thereof, and stereoisomers thereof, a method of preparing the compound, and a pharmaceutical composition for preventing, alleviating, or treating cancer containing the compound as an active ingredient.

In one aspect, the present invention provides a compound selected from a pyridinyl triazine derivative compound represented by the following Formula 1, a pharmaceutically acceptable salt thereof, a hydrate thereof, a solvate thereof, and a stereoisomer thereof:

[Formula 1]

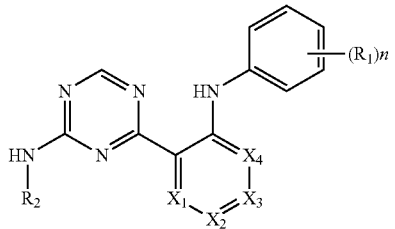

wherein
$X_1$, $X_2$, $X_3$ and $X_4$ are each independently N or CH;
$R_1$ is a halogen atom or any one selected from a $C_1$-$C_8$ alkyl group, a $C_1$-$C_8$ alkoxy group, and

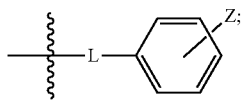

$R_2$ is a halogen atom, a $C_1$-$C_{13}$ alkyl group, a $C_3$-$C_{10}$ cyclic group, a $C_3$-$C_{10}$ aryl group, or a $C_3$-$C_{10}$ heteroaryl group,
wherein the $C_1$-$C_{13}$ alkyl group or the $C_3$-$C_{10}$ cyclic group contains at least one substituent selected from the group consisting of a hydroxy group, a halogen group, a $C_1$-$C_{13}$ alkyl group, a $C_1$-$C_6$ alkoxy group, an amino group (—$NR_3R_4$), a nitro group (—$N(O)_2$), an amide group (—(C=O)$NR_3R_4$), a carboxyl group (—C(O)OH), a nitrile group (—CN), a urea group (—$NR_3$(C=O)$NR_4$—), a sulfonamide group (—NHS(O)$_2$—), a sulfide group (—S—), a sulfone group (—S(O)$_2$—), a phosphinyl group (—P(O)$R_3R_4$), a $C_5$-$C_{10}$ aryl group, a $C_3$-$C_{10}$ heteroaryl group, and a $C_3$-$C_{10}$ heterocyclic group,
the $C_3$-$C_{10}$ aryl group or the $C_3$-$C_{10}$ heteroaryl group contains at least one substituent selected from the group consisting of hydrogen, a hydroxy group, a halogen group, a carbonyl group (—(C=O)$R_3R_4$), a $C_1$-$C_3$ alkyl group substituted or unsubstituted with halogen or a $C_3$-$C_{10}$ heterocyclic group, a $C_1$-$C_3$ alkoxy group substituted or unsubstituted with halogen or a $C_3$-$C_{10}$ heterocyclic group, a $C_6$-$C_{10}$ phenoxy group, an amino group (—$NR_3R_4$), a nitro group (—$N(O)_2$), an amide group (—(C=O)$NR_3R_4$), a carboxyl group (—C(O)OH), a nitrile group (—CN), a urea group (—$NR_3$(C=O)$NR_4$—), a sulfonamide group (—NHS(O)$_2$—), a sulfide group (—S—), a sulfone group (—S(O)$_2$—), a phosphinyl group (—P(O)$R_3R_4$), a $C_6$-$C_{10}$ aryl group, a $C_3$-$C_{10}$ heteroaryl group, and a $C_3$-$C_{10}$ heterocyclic group,
$R_3$ and $R_4$ described above each independently contain at least one selected from the group consisting of hydrogen, a $C_1$-$C_6$ alkyl group, a $C_1$-$C_6$ alkenyl group, a $C_1$-$C_6$ alkynyl group, a $C_6$-$C_{10}$ aryl group, a $C_3$-$C_{10}$ heteroaryl group, and a $C_3$-$C_{10}$ heterocyclic group,
the $C_3$-$C_{10}$ heteroaryl group contains at least one heteroatom selected from the group consisting of N, O, and S,
L is —NHC(O)— or —C(O)NH—,
Z includes one to four substituents selected from $C_1$-$C_8$ alkyl, $C_1$-$C_8$ haloalkyl, 5-membered or 6-membered heteroaryl containing 1 to 3 nitrogen atoms, and 5-membered or 6-membered heterocycloalkyl containing 1 to 3 heteroatoms selected from nitrogen and oxygen atoms, wherein the heteroaryl or heterocycloalkyl is substituted or unsubstituted with $C_1$-$C_8$ alkyl; and
n is an integer from 0 to 6, wherein, when n is 2 or more, $R_1$ is each independently selected from a halogen atom, a $C_1$-$C_8$ alkyl group, a $C_1$-$C_8$ alkoxy group and

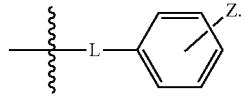

In an embodiment, $R_1$ is any one selected from chloro, methyl, methoxy, —NHC(O)-(3-trifluoromethylbenzene), and —C(O)NH-(3-trifluoromethylbenzene), and
$R_2$ is hydrogen, a methyl group, a substituted methyl group, a $C_3$-$C_6$ aryl group, or a $C_3$-$C_6$ heteroaryl group,
wherein the substituted methyl group includes at least one selected from the group consisting of a $C_1$-$C_6$ alkoxy group, an amino group (—$NR_3R_4$), a nitro group (—N(O)$_2$), an amide group (—(C=O)$NR_3R_4$), a carboxylic acid group (—C(O)OH), a nitrile group (—CN), a urea group (—$NR_3$(C=O)$NR_4$—), a sulfonamide group (—NHS(O)$_2$—), a sulfide group (—S—), a sulfone group (—S(O)$_2$—), a phosphinyl group (—P(O)$R_3R_4$), a $C_6$-$C_{10}$ aryl group, a $C_3$-$C_{10}$ heteroaryl group, and a $C_3$-$C_{10}$ heterocyclic group,
the $C_3$-$C_6$ aryl group or the $C_3$-$C_6$ heteroaryl group contains at least one substituent selected from the group consisting of hydrogen, a hydroxy group, a halogen group, a carbonyl group (—(C=O)$R_3R_4$), a $C_1$-$C_3$ alkyl group substituted or unsubstituted with halogen or a $C_3$-$C_{10}$ heterocyclic group, a $C_1$-$C_3$ alkoxy group substituted or unsubstituted with halogen or a $C_3$-$C_{10}$ heterocyclic group, a $C_6$-$C_{10}$ phenoxy group, an amino group (—$NR_3R_4$), a nitro group (—$N(O)_2$), an amide group (—(C=O)NR₃R₄), a carboxyl group (—C(O)OH), a nitrile group (—CN), a urea group (—NR₃(C=O)NR₄—), a sulfonamide group (—NHS(O)₂—), a sulfide group (—S—), a sulfone group (—S(O)₂—), a phosphinyl group (—P(O)R₃R₄), a $C_6$-$C_{10}$ aryl group, a $C_3$-$C_{10}$ heteroaryl group, and a $C_3$-$C_{10}$ heterocyclic group, $R_3$ and $R_4$ described above each independently contain at least one selected from the group consisting of hydrogen, a $C_1$-$C_6$ alkyl group, a $C_1$-$C_6$ alkenyl group, a $C_1$-$C_6$ alkynyl group, a $C_6$-$C_{10}$ aryl group, a $C_3$-$C_{10}$ heteroaryl group, and a $C_3$-$C_{10}$ heterocyclic group, and the $C_3$-$C_6$ heteroaryl group contains at least one heteroatom selected from the group consisting of N, O, and S.

In an embodiment, at least one of $X_1$, $X_2$, $X_3$, and $X_4$ is N.

In an embodiment, $R_2$ is a hydrogen atom, a $C_1$-$C_6$ alkyl group, —(CH₂)ₘ—NR³R⁴, or -A-(CH₂)ₒ-(Q)ₚ-R⁵, A is a $C_6$-$C_{15}$ aryl group, a 5- or 6-membered heteroaryl group containing 1 to 3 nitrogen atoms, or a 5- or 6-membered heterocycloalkyl group containing 1 to 3 heteroatoms selected from a nitrogen atom and an oxygen atom, wherein the aryl group, heteroaryl group, or heterocycloalkyl group may be substituted or unsubstituted with 1 to 3 substituents selected from $C_1$-$C_8$ alkyl, $C_1$-$C_8$ alkoxy, $C_1$-$C_8$ haloalkyl, and $C_1$-$C_8$ alkoxycarbonyl;

Q is a 5- or 6-membered heterocycloalkyl group or a biheterocycloalkyl group containing 1 to 3 heteroatoms selected from a nitrogen atom and an oxygen atom, R³ and R⁴ each independently include at least one selected from the group consisting of hydrogen, a $C_1$-$C_6$ alkyl group, a $C_1$-$C_6$ alkenyl group, a $C_1$-$C_6$ alkynyl group, a $C_6$-$C_{10}$ aryl group, a $C_3$-$C_{10}$ heteroaryl group, and a $C_3$-$C_{10}$ heterocyclyl group, R⁵ is a hydrogen atom, C(O)OR⁷ (wherein R⁷ is a hydrogen atom or a $C_1$-$C_8$ alkyl group), or a $C_1$-$C_8$ alkyl group, m is an integer from 1 to 6,
is an integer from 0 to 6, and
p is 0 or 1.

In an embodiment, $R_2$ is a hydrogen atom, a methyl group, an ethyl group, a cyclopropyl group, a 3-(dimethylamino)ethyl group, a 3-(dimethylamino)propyl group, a phenyl group, a methoxy-substituted phenyl group, a trifluoromethyl-substituted phenyl group, a methoxy- or methoxycarbonyl-substituted phenyl group, a pyridinyl group, a pyrimidinyl group, a 4-methylpiperidin-1-yl group, or a 4-ethylpiperidin-1-yl group.

In an embodiment, p is 1,
Q is a piperidinyl group, a bipiperidinyl group, a piperazinyl group, or a morpholino group, and
R⁵ is a hydrogen atom, a methyl group, an ethyl group, a cyclohexylmethyl group, or a methoxycarbonyl group.

In an embodiment, $X_1$ is CH, $X_2$ is CH, $X_3$ is CH, and $X_4$ is N, and
n is 4, and the four groups of $R_1$ are Cl at the $2^{nd}$ position, Cl at the $6^{th}$ position, OCH₃ at the $3^{rd}$ position, and OCH₃ at the $5^{th}$ position, respectively.

In an embodiment, the pyridinyl triazine derivative compound is selected from the group consisting of the following compounds of Compound Nos. 1 to 24:

(Compound No. 1) 4-(2-((2-((2,6-dichloro-3,5-dimethoxyphenyl)amino)pyridin-3-yl)-N-(4-(4-ethylpiperazin-1-yl)phenyl)-1,3,5-triazin-2-amine;

(Compound No. 2) 4-(2-((2,6-dichloro-3,5-dimethoxyphenyl)amino)pyridin-3-yl)-1,3,5-triazin-2-amine;

(Compound No. 3) N¹-(4-(2-((2,6-dichloro-3,5-dimethoxyphenyl)amino)pyridin-3-yl)-1,3,5-triazin-2-yl)-N²,N²-dimethylethane-1,2-diamine;

(Compound No. 4) 4-(2-((2,6-dichloro-3,5-dimethoxyphenyl)amino)pyridin-3-yl)-N-phenyl-1,3,5-triazin-2-amine;

(Compound No. 5) 4-(2-((2-((2,6-dichloro-3,5-dimethoxyphenyl)amino)pyridin-3-yl)-N-(2-methoxyphenyl)-1,3,5-triazin-2-amine;

(Compound No. 6) 4-(2-((2-((2,6-dichloro-3,5-dimethoxyphenyl)amino)pyridin-3-yl)-N-(3-methoxyphenyl)-1,3,5-triazin-2-amine;

(Compound No. 7) N¹-(4-(2-((2,6-dichloro-3,5-dimethoxyphenyl)amino)pyridin-3-yl)-1,3,5-triazin-2-yl)-N⁴,N⁴-dimethylbenzene-1,4-diamine;

(Compound No. 8) 4-(2-((2-((2,6-dichloro-3,5-dimethoxyphenyl)amino)pyridin-3-yl)-N-(3-(4-ethylpiperazin-1-yl)phenyl)-1,3,5-triazin-2-amine;

(Compound No. 9) 4-(2-((2-((2,6-dichloro-3,5-dimethoxyphenyl)amino)pyridin-3-yl)-N-(4-morpholinophenyl)-1,3,5-triazin-2-amine;

(Compound No. 10) 4-(2-((2-((2,6-dichloro-3,5-dimethoxyphenyl)amino)pyridin-3-yl)-N-(6-morpholinopyridin-3-yl)-1,3,5-triazin-2-amine;

(Compound No. 11) 1-(4-(4-((4-(2-((2,6-dichloro-3,5-dimethoxyphenyl)amino)pyridin-3-yl)-1,3,5-triazin-2-yl)amino)phenyl)piperazin-1-yl)ethan-1-one;

(Compound No. 12) 1-(4-((4-(2-((2-((2,6-dichloro-3,5-dimethoxyphenyl)amino)pyridin-3-yl)-1,3,5-triazin-2-yl)amino)phenyl)piperidin-4-ol;

(Compound No. 13) 4-(2-((2-((2,6-dichloro-3,5-dimethoxyphenyl)amino)pyridin-3-yl)-N-(4-((3S,5R)-3,5-dimethylpiperazin-1-yl)phenyl)-1,3,5-triazin-2-amine;

(Compound No. 14) 4-(2-((2-((2,6-dichloro-3,5-dimethoxyphenyl)amino)pyridin-3-yl)-N-(2-methoxy-4-(4-methylpiperazin-1-yl)phenyl)-1,3,5-triazin-2-amine;

(Compound No. 15) 4-(2-((2-((2,6-dichloro-3,5-dimethoxyphenyl)amino)pyridin-3-yl)-N-(2-methoxy-4-morpholinophenyl)-1,3,5-triazin-2-amine;

(Compound No. 16) 4-(2-((2-((2,6-dichloro-3,5-dimethoxyphenyl)amino)pyridin-3-yl)-N-(2-methoxy-6-morpholinopyridin-3-yl)-1,3,5-triazin-2-amine;

(Compound No. 17) 4-(2-((2-((2,6-dichloro-3,5-dimethoxyphenyl)amino)pyridin-3-yl)-N-(4-((3S,5R)-3,5-dimethylpiperazin-1-yl)-2-methoxyphenyl)-1,3,5-triazin-2-amine;

(Compound No. 18) 4-(2-((2-((2,6-dichloro-3,5-dimethoxyphenyl)amino)pyridin-3-yl)-N-(1-methyl-1H-pyrazol-4-yl)-1,3,5-triazin-2-amine;

(Compound No. 19) N-(1-allyl-1H-pyrazol-4-yl)-4-(2-((2,6-dichloro-3,5-dimethoxyphenyl)amino)pyridin-3-yl)-1,3,5-triazin-2-amine;

(Compound No. 20) 4-(2-((2,6-dichloro-3,5-dimethoxyphenyl)amino)pyridin-3-yl)-N-(1-(3-(dimethylamino)propyl)-1H-pyrazol-4-yl)-1,3,5-triazin-2-amine;

(Compound No. 21) 4-(2-((2,6-dichloro-3,5-dimethoxyphenyl)amino)pyridin-3-yl)-N-(1-(tetrahydro-2H-pyran-4-yl)-1H-pyrazol-4-yl)-1,3,5-triazin-2-amine;

(Compound No. 22) 4-(2-((2-((2,6-dichloro-3,5-dimethoxyphenyl)amino)pyridin-3-yl)-N-(1-(1-isopropylpiperidin-4-yl)-1H-pyrazol-4-yl)-1,3,5-triazin-2-amine;

(Compound No. 23) tert-butyl 4-(4-((4-(2-((2,6-dichloro-3,5-dimethoxyphenyl)amino)pyridin-3-yl)-1,3,5-triazin-2-yl)amino)-1H-pyrazol-1-yl)piperidine-1-carboxylate; and (Compound No. 24) 4-(2-((2,6-dichloro-3,5-dimethoxyphenyl)amino)pyridin-3-yl)-N-(1-(piperidin-4-yl)-1H-pyrazol-4-yl)-1,3,5-triazin-2-amine.

As used herein, the term "substitution" means that, when one or more hydrogen atoms in an organic compound are replaced with another atomic group to form a derivative, the other atomic group is introduced in place of a hydrogen atom, and the term "substituent" refers to the atomic group introduced at that time.

For example, the substituent is a halogen atom, a $C_1$-$C_{20}$ alkyl group substituted with a halogen atom (e.g., $CCF_3$, $CHCF_2$, $CH_2F$ or $CCl_3$), $C_1$-$C_{20}$ alkoxy, $C_1$-$C_{20}$ alkoxyalkyl, a hydroxy group, a nitro group, a cyano group, an amino group, an amidino group, hydrazine, hydrazone, a carboxyl group or salt thereof, a sulfonyl group, a sulfamoyl group, a sulfonic acid group or salt thereof, a phosphoric acid or salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, a $C_6$-$C_{20}$ heteroaryloxyalkyl group or a $C_6$-$C_{20}$ heteroarylalkyl group.

In the definition of substituents in the present invention, the term "alkyl" means an aliphatic hydrocarbon radical. The alkyl may be a saturated alkyl that does not contain an alkenyl or alkynyl moiety, or an unsaturated alkyl that contains at least one alkenyl or alkynyl moiety. The term "alkenyl" means a group containing at least one carbon-carbon double bond, and the term "alkynyl" means a group containing at least one carbon-carbon triple bond. The alkyl may have a cyclic, branched, or straight-chain form when used alone or in combination.

The term "aryl" means an aromatic monocarbocyclic group having 6 carbon atoms which may be further fused, singly or in combination with another radical, with a 5- or 6-membered carbocyclic group which may be aromatic, and may be saturated or unsaturated. Examples of the aryl may include, but are not limited to, phenyl, indanyl, 1-naphthyl, 2-naphthyl, tetrahydronaphthyl, and the like. The aryl may be linked to another group at an appropriate position on the aromatic ring.

The term "alkoxy" refers to an alkyl group (i.e., —O-alkyl) linked to another group via an oxygen atom. The alkoxy group may be substituted or unsubstituted with at least one appropriate substituent. Examples of the alkoxy group include, but are not limited to, ($C_1$-$C_6$) alkoxy groups such as —O-methyl, —O-ethyl, —O-propyl, —O-isopropyl, —O-2-methyl-1-propyl, —O-2-methyl-2-propyl, —O-2-methyl-1-butyl, —O-3-methyl-1-butyl, —O-2-methyl-3-butyl, —O-2,2-dimethyl-1-propyl, —O-2-methyl-1-pentyl, -3-O-methyl-1-pentyl, —O-4-methyl-1-pentyl, —O-2-methyl-2-pentyl, —O-3-methyl-2-pentyl, —O-4-methyl-2-pentyl, —O-2,2-dimethyl-1-butyl, —O-3,3-dimethyl-butyl, —O-2-ethyl-1-butyl, —O-butyl, —O-isobutyl, —O-t-butyl, —O-pentyl, —O-isopentyl, —O-neopentyl, and —O-hexyl.

The term "phenoxy" means a phenyl group (i.e., —O-aryl) linked to another group via an oxygen atom. The phenoxy group may be substituted or unsubstituted with at least one selected from a halogen, an alkyl group, an aryl group, and a heteroaryl group, but is not limited thereto.

The term "amine group" means an alkyl group linked to another group via a nitrogen atom (i.e., —NH— or —N-alkyl). The amine group may be substituted or unsubstituted with at least one appropriate substituent. Examples of the amine group include, but are not limited to, ($C_1$-$C_6$)amino groups, such as —NH-methyl, —NH-ethyl, —NH-propyl, —NH-isopropyl, —NH-2-methyl-1-propyl, —NH-2-methyl-2-propyl, —NH-2-methyl-1-butyl, —NH-3-methyl-1-butyl, —NH-2-methyl-3-butyl, —NH-2,2-dimethyl-1-propyl, —NH-2-methyl-1-pentyl, 3-NH-methyl-1-pentyl, —NH-4-methyl-1-pentyl, —NH-2-methyl-2-pentyl, —NH-3-methyl-2-pentyl, —NH-4-methyl-2-pentyl, —NH-2,2-dimethyl-1-butyl, —NH-3,3-dimethyl-butyl, —NH-2-ethyl-1-butyl, —NH-butyl, —NH-isobutyl, —NH-t-butyl, —NH-pentyl, —NH-isopentyl, —NH-neopentyl, —NH-hexyl, —N,N-dimethyl, —N-methyl-N-ethyl, —N-methyl-N-propyl, —N-methyl-isopropyl, —N-methyl-N-butyl, —N-methyl-N-isobutyl, —N-methyl-N-pentyl, —N-methyl-N-isopentyl, N-methyl-N-hexyl, N-methyl-N-isohexyl, —N,N-diethyl, —N-ethyl-N-propyl, —N-ethyl-N-isopropyl, —N-ethyl-N-butyl, —N-ethyl-N-isobutyl, —N-ethyl-N-pentyl, —N-ethyl-N-isopentyl, —N-ethyl-N-hexyl, —N-ethyl-N-isohexyl, —N,N-dipropyl, —N-propyl-N-isopropyl, —N-propyl-N-butyl, —N-propyl-N-isobutyl, —N-propyl-N-pentyl, —N-propyl-N-isopentyl, —N-propyl-N-hexyl, —N-propyl-N-isohexyl, —N,N-dibutyl, —N-butyl-N-isobutyl, —N-butyl-N-pentyl, —N-butyl-N-isopentyl, —N-butyl-N-hexyl, —N-butyl-N-isohexyl, —N,N-dipentyl, —N-pentyl-N-hexyl, —N-pentyl-N-isohexyl, and —N,N-dihexyl.

The term "halogen atom" refers to an atom in group 7 of the periodic table. The halogen atom includes fluorine (F), chlorine (Cl), bromine (Br), and iodine (I).

The term "alkyl group" refers to a branched or cyclic aliphatic saturated hydrocarbon group having 1 to 8 carbon atoms, and examples thereof include methyl, ethyl, n-propyl, i-propyl, cyclopropyl, n-butyl, i-butyl, t-butyl, cyclobutyl, cyclopropylmethyl, n-pentyl, i-pentyl, neopentyl, t-pentyl, cyclopentyl, cyclobutylmethyl, n-hexyl, i-hexyl, cyclohexyl, cyclopentylmethyl, heptyl, cyclohexylmethyl, octyl, and the like.

The term "haloalkyl group" refers to an alkyl group, a hydrogen atom of which is substituted with at least one halogen atom, such as a trifluoromethyl group.

The term "alkoxy group" refers to a hydroxy group, a hydrogen atom of which is substituted by a substituent selected from a $C_1$-$C_8$ alkyl group, and examples thereof include methoxy, ethoxy, n-propoxy, i-propoxy, n-butoxy, i-butoxy, and t-butoxy.

The term "aryl group" refers to a monocyclic, bicyclic, or tricyclic aromatic hydrocarbon group having 6 to 15 carbon atoms, and examples thereof include phenyl, naphthyl, anthranil, phenanthril, and the like.

The term "carbonyl group" means —(C═O)—, which may be substituted with hydrogen, an alkyl group, an alkoxy group and an amino group, but without limitation thereto.

The term "heterocycle group" means a heteroaromatic compound containing at least one heteroatom selected from the group consisting of N, O, and S, unless otherwise mentioned. Preferably, the heterocyclic group may include a pyrrolidine group, a furan group, a morpholine group, a piperazine group and a piperidine group, and more preferably a pyrrolidine group, a piperidine group, a piperazine group, and a morpholine group, but is not limited thereto.

The term "heteroaryl group" means a heteroaromatic compound containing at least one heteroatom selected from the group consisting of N, O, and S, unless otherwise mentioned. Preferably, the heteroaryl group is a pyridine group, a pyrazine group, a pyrimidine group, a pyridazine group, a pyrazole group, an imidazole group, a triazole group, an indole group, an oxadiazole group, a thiadiazole group, a quinoline group, an isoquinoline group, an isoxazole group, an oxazole group, a thiazolyl group, and a pyrrole group, but is not limited thereto.

As used herein, the term "heteroaryl group" refers to a monocyclic, bicyclic, or tricyclic aromatic heterohydrocarbon group containing one or more heteroatoms selected from N, O, and S, and examples thereof include pyrrolyl, furanyl, thiophenyl, pyrazolyl, imidazolyl, oxazolyl, isoxazolyl, thiazolyl, isothiazolyl, triazolyl, oxadiazolyl, thiadiazolyl, tetrazolyl, pyridinyl, pyrazinyl, pyridazinyl, pyrimidinyl, indolyl, isoindolyl, benzofuranyl, benzofurazanyl, dibenzofuranyl, isobenzofuranyl, indazolyl, benzimidazolyl, benzoxazolyl, benzisoxazolyl, benzothiazolyl, dibenzothiophenyl, naphthyridyl, benzisothiazolyl, quinolinyl, isoquinolinyl, quinoxalinyl, phthalazinyl, chinolinyl, quinazolinyl, and the like.

As used herein, the term "heterocycloalkyl group" refers to a 5- or 6-membered alicyclic heterohydrocarbon group containing at least one heteroatom selected from N and O, and examples thereof include morpholinyl, piperidinyl, piperazinyl, N-protected piperazinyl, and the like. The N-protecting group of piperazinyl may typically include an alkyl group.

The term "derivative" refers to a compound obtained by substituting a part of the structure of the compound with another atom or atomic group.

The term "stereoisomer" refers to a compound that has an identical molecular formula and an identical method of linking constituent atoms, but has a different spatial arrangement between atoms. A stereoisomer may be a diastereomer or an enantiomer. An enantiomer is an isomer that does not overlap a mirror structure thereof, like the relationship between the left and right hands, which is also called "an optical isomer". An enantiomer is divided into R (rectus: clockwise) and S (sinister: counterclockwise) forms when 4 or more substituents of the chiral center carbon are different. A diastereoisomer is a stereoisomer that does not have a mirror relationship, and may be divided into cis and trans isomers depending on the difference in the spatial arrangement of atoms.

Specific examples of pyridinyl triazine derivative compounds preferred as the compounds according to the present invention are as follows:

(Compound No. 1): 4-(2-((2-((2,6-dichloro-3,5-dimethoxyphenyl)amino)pyridin-3-yl)-N-(4-(4-ethylpiperazin-1-yl)phenyl)-1,3,5-triazin-2-amine;

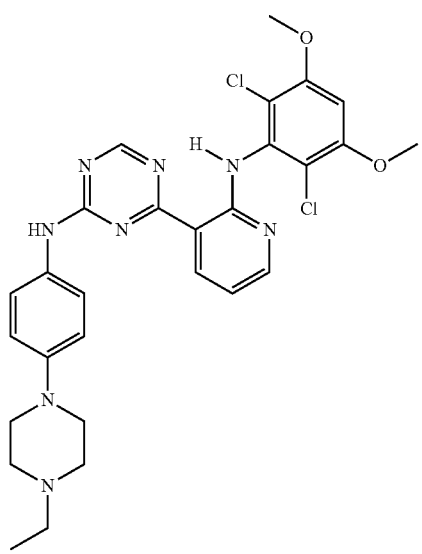

(Compound No. 2): 4-(2-((2,6-dichloro-3,5-dimethoxyphenyl)amino)pyridin-3-yl)-1,3,5-triazin-2-amine;

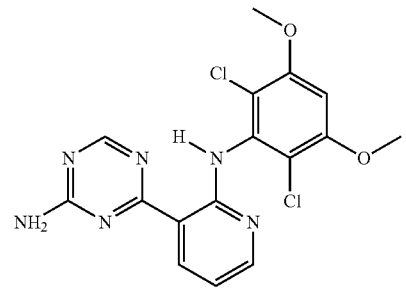 [SMILES: COc1cc(OC)c(Cl)c(Nc2ncccc2-c2ncnc(N)n2)c1Cl]

(Compound No. 3): $N^1$-(4-(2-((2,6-dichloro-3,5-dimethoxyphenyl)amino)pyridin-3-yl)-1,3,5-triazin-2-yl)-$N^2$,$N^2$-dimethylethane-1,2-diamine;

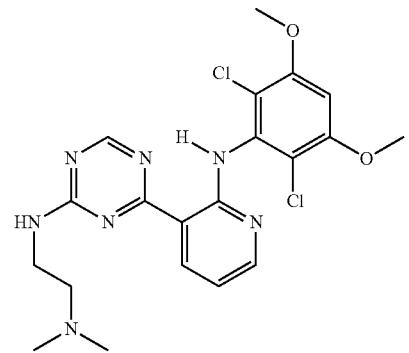

(Compound No. 4): 4-(2-((2,6-dichloro-3,5-dimethoxyphenyl)amino)pyridin-3-yl)-N-phenyl-1,3,5-triazin-2-amine;

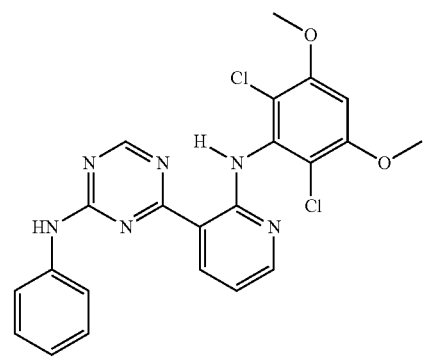 [SMILES: COc1cc(OC)c(Cl)c(Nc2ncccc2-c2ncnc(Nc3ccccc3)n2)c1Cl]

(Compound No. 5): 4-(2-((2-((2,6-dichloro-3,5-dimethoxyphenyl)amino)pyridin-3-yl)-N-(2-methoxyphenyl)-1,3,5-triazin-2-amine;

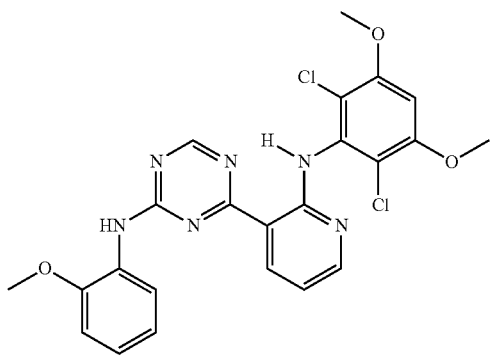

(Compound No. 6): 4-(2-((2-((2,6-dichloro-3,5-dimethoxyphenyl)amino)pyridin-3-yl)-N-(3-methoxyphenyl)-1,3,5-triazin-2-amine;

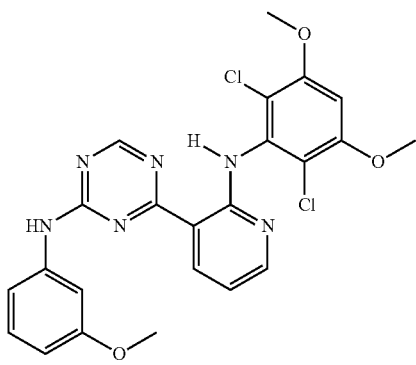 [SMILES: COc1cccc(Nc2ncnc(-c3cccnc3Nc3c(Cl)c(OC)cc(OC)c3Cl)n2)c1]

(Compound No. 7): N¹-(4-(2-((2,6-dichloro-3,5-dimethoxyphenyl)amino)pyridin-3-yl)-1,3,5-triazin-2-yl)-N⁴,N⁴-dimethylbenzene-1,4-diamine;

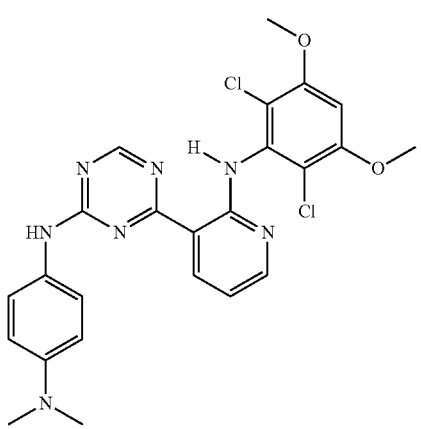 [SMILES: COc1cc(OC)c(Cl)c(Nc2ncccc2-c2ncnc(Nc3ccc(N(C)C)cc3)n2)c1Cl]

(Compound No. 8): 4-(2-((2-((2,6-dichloro-3,5-dimethoxyphenyl)amino)pyridin-3-yl)-N-(3-(4-ethylpiperazin-1-yl)phenyl)-1,3,5-triazin-2-amine;

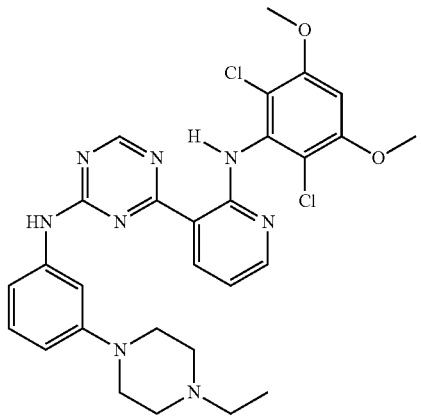 [SMILES: CCN1CCN(c2cccc(Nc3ncnc(-c4cccnc4Nc4c(Cl)c(OC)cc(OC)c4Cl)n3)c2)CC1]

(Compound No. 9): 4-(2-((2-((2,6-dichloro-3,5-dimethoxyphenyl)amino)pyridin-3-yl)-N-(4-morpholinophenyl)-1,3,5-triazin-2-amine;

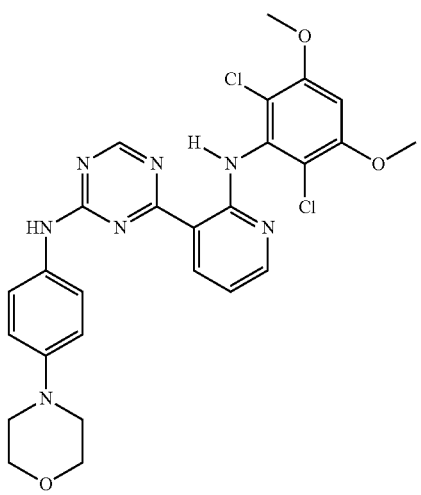 [SMILES: COc1cc(OC)c(Cl)c(Nc2ncccc2-c2ncnc(Nc3ccc(N4CCOCC4)cc3)n2)c1Cl]

(Compound No. 10): 4-(2-((2-((2,6-dichloro-3,5-dimethoxyphenyl)amino)pyridin-3-yl)-N-(6-morpholinopyridin-3-yl)-1,3,5-triazin-2-amine;

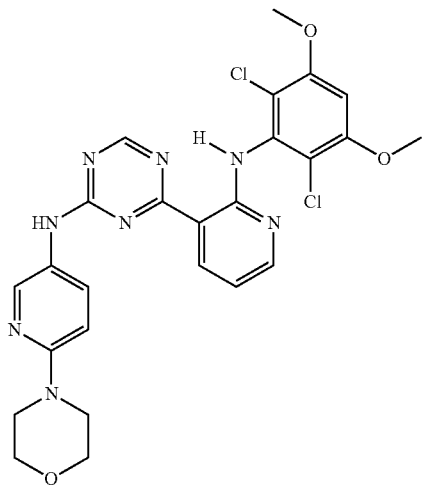 [SMILES: COc1cc(OC)c(Cl)c(Nc2ncccc2-c2ncnc(Nc3ccc(N4CCOCC4)nc3)n2)c1Cl]

(Compound No. 11): 1-(4-(4-((4-(2-((2,6-dichloro-3,5-dimethoxyphenyl)amino)pyridin-3-yl)-1,3,5-triazin-2-yl)amino)phenyl)piperazin-1-yl)ethan-1-one;

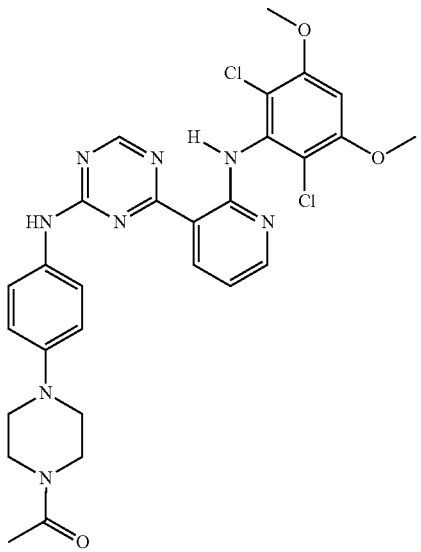 [SMILES: COc1cc(OC)c(Cl)c(Nc2ncccc2-c2ncnc(Nc3ccc(N4CCN(C(C)=O)CC4)cc3)n2)c1Cl]

(Compound No. 12): 1-(4-((4-(2-((2-((2,6-dichloro-3,5-dimethoxyphenyl)amino)pyridin-3-yl)-1,3,5-triazin-2-yl)amino)phenyl)piperidin-4-ol;

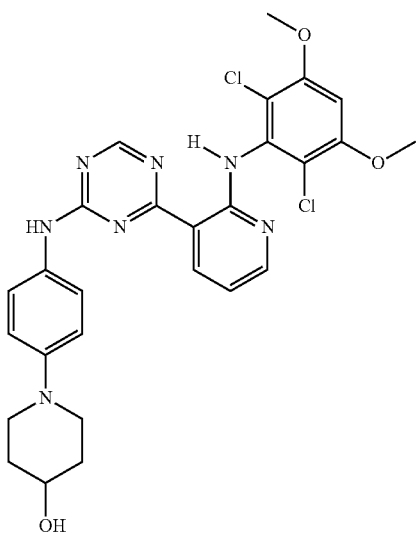 [SMILES: COc1cc(OC)c(Cl)c(Nc2ncccc2-c2ncnc(Nc3ccc(N4CCC(O)CC4)cc3)n2)c1Cl]

(Compound No. 13): 4-(2-((2-((2,6-dichloro-3,5-dimethoxyphenyl)amino)pyridin-3-yl)-N-(4-((3S,5R)-3,5-dimethylpiperazin-1-yl)phenyl)-1,3,5-triazin-2-amine;

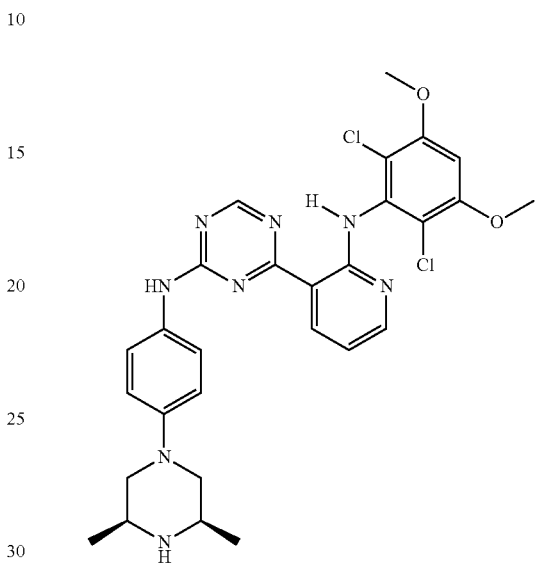

(Compound No. 14): 4-(2-((2-((2,6-dichloro-3,5-dimethoxyphenyl)amino)pyridin-3-yl)-N-(2-methoxy-4-(4-methylpiperazin-1-yl)phenyl)-1,3,5-triazin-2-amine;

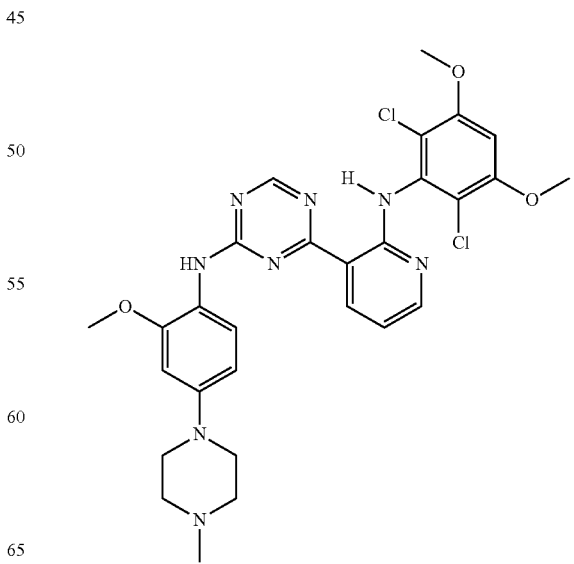

(Compound No. 15): 4-(2-((2-((2,6-dichloro-3,5-dimethoxyphenyl)amino)pyridin-3-yl)-N-(2-methoxy-4-morpholinophenyl)-1,3,5-triazin-2-amine;

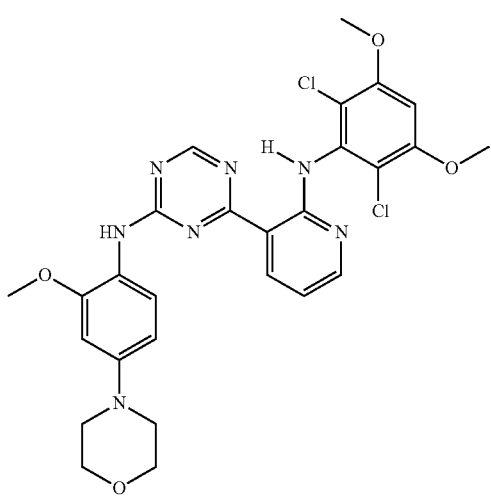

(Compound No. 16): 4-(2-((2-((2,6-dichloro-3,5-dimethoxyphenyl)amino)pyridin-3-yl)-N-(2-methoxy-6-morpholinopyridin-3-yl)-1,3,5-triazin-2-amine;

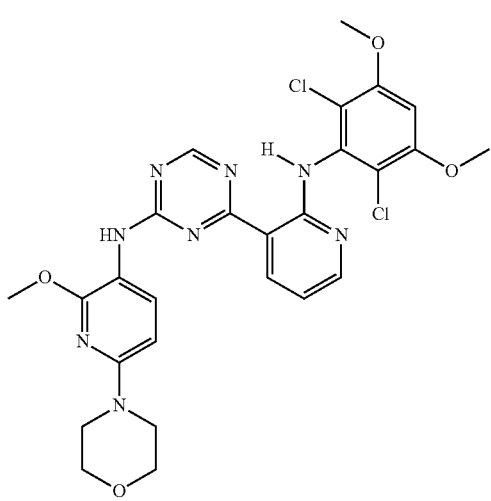

(Compound No. 17): 4-(2-((2-((2,6-dichloro-3,5-dimethoxyphenyl)amino)pyridin-3-yl)-N-(4-((3S,5R)-3,5-dimethylpiperazin-1-yl)-2-methoxyphenyl)-1,3,5-triazin-2-amine;

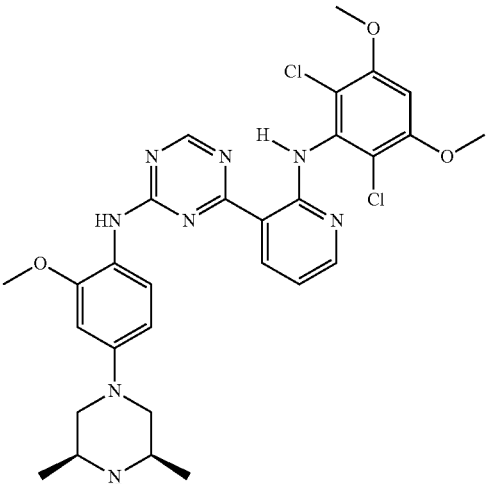

(Compound No. 18): 4-(2-((2-((2,6-dichloro-3,5-dimethoxyphenyl)amino)pyridin-3-yl)-N-(1-methyl-1H-pyrazol-4-yl)-1,3,5-triazin-2-amine;

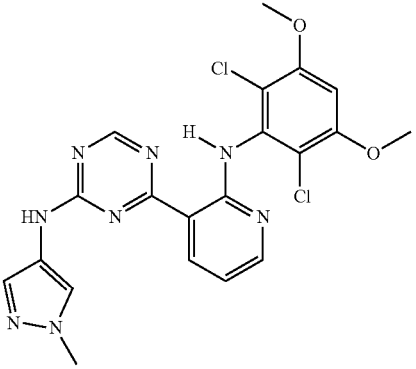 [SMILES: COc1cc(OC)c(Cl)c(Nc2ncccc2-c2ncnc(Nc3cnn(C)c3)n2)c1Cl]

(Compound No. 19): N-(1-allyl-1H-pyrazol-4-yl)-4-(2-((2,6-dichloro-3,5-dimethoxyphenyl)amino)pyridin-3-yl)-1,3,5-triazin-2-amine;

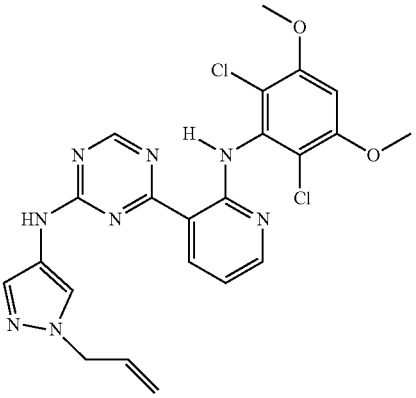 [SMILES: C=CCn1cc(Nc2ncnc(-c3cccnc3Nc3c(Cl)c(OC)cc(OC)c3Cl)n2)cn1]

(Compound No. 20): 4-(2-((2,6-dichloro-3,5-dimethoxy-phenyl)amino)pyridin-3-yl)-N-(1-(3-(dimethylamino)propyl)-1H-pyrazol-4-yl)-1,3,5-triazin-2-amine;

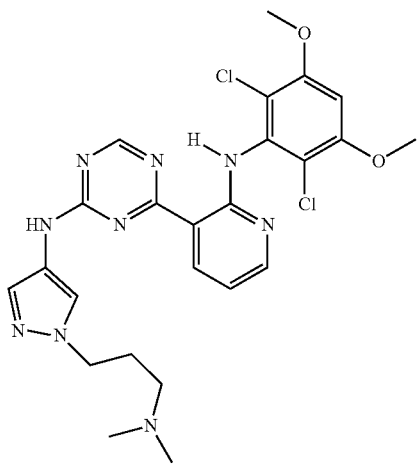 [SMILES: COc1cc(OC)c(Cl)c(Nc2ncccc2-c2ncnc(Nc3cnn(CCCN(C)C)c3)n2)c1Cl]

(Compound No. 21): 4-(2-((2,6-dichloro-3,5-dimethoxy-phenyl)amino)pyridin-3-yl)-N-(1-(tetrahydro-2H-pyran-4-yl)-1H-pyrazol-4-yl)-1,3,5-triazin-2-amine;

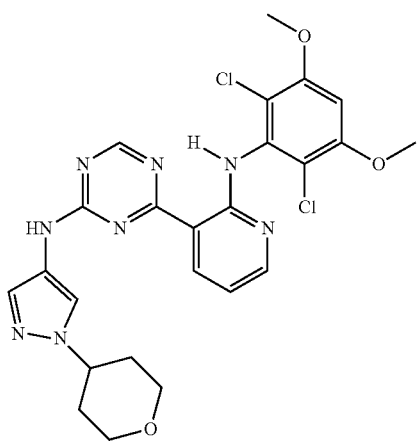 [SMILES: COc1cc(OC)c(Cl)c(Nc2ncccc2-c2ncnc(Nc3cnn(C4CCOCC4)c3)n2)c1Cl]

(Compound No. 22): 4-(2-((2-((2,6-dichloro-3,5-dimethoxyphenyl)amino)pyridin-3-yl)-N-(1-(1-isopropylpiperidin-4-yl)-1H-pyrazol-4-yl)-1,3,5-triazin-2-amine;

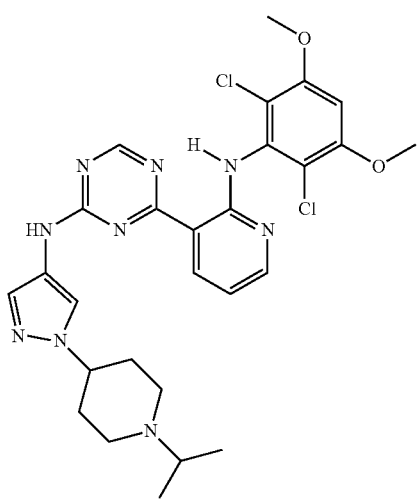 [SMILES: COc1cc(OC)c(Cl)c(Nc2ncccc2-c2ncnc(Nc3cnn(C4CCN(C(C)C)CC4)c3)n2)c1Cl]

(Compound No. 23): Tert-butyl 4-(4-((4-(2-((2,6-dichloro-3,5-dimethoxyphenyl)amino)pyridin-3-yl)-1,3,5-triazin-2-yl)amino)-1H-pyrazol-1-yl)piperidine-1-carboxylate; and

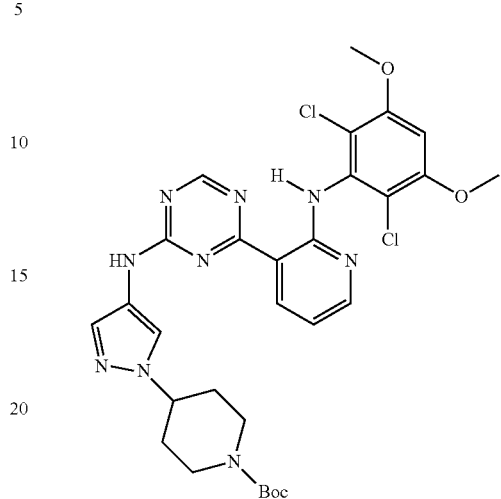

(Compound No. 24): 4-(2-((2,6-dichloro-3,5-dimethoxy-phenyl)amino)pyridin-3-yl)-N-(1-(piperidin-4-yl)-1H-pyrazol-4-yl)-1,3,5-triazin-2-amine.

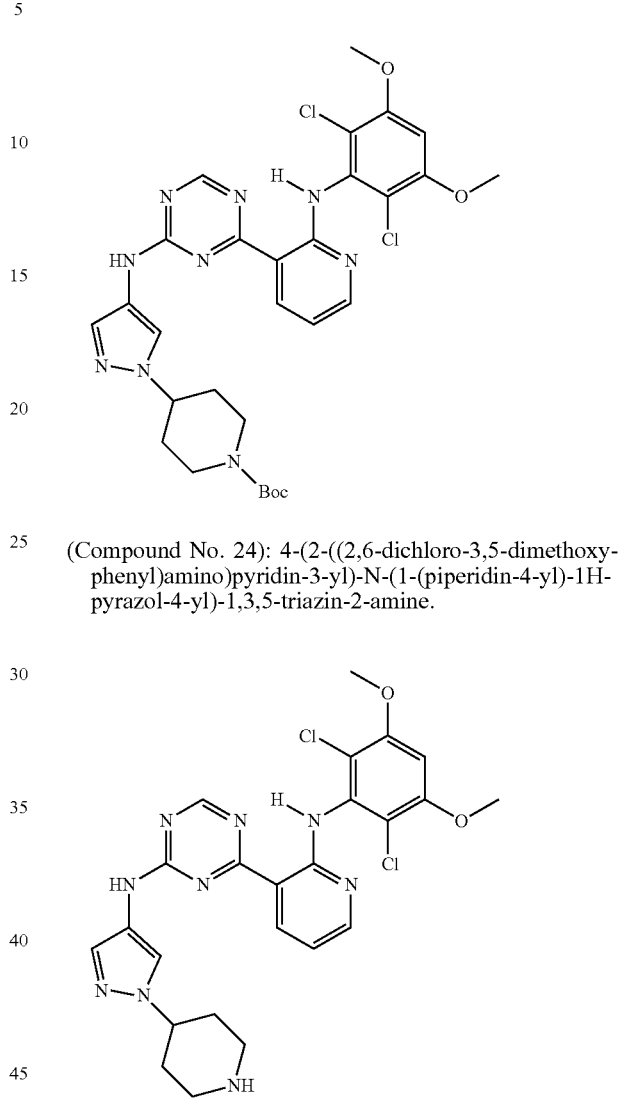

The compound of Formula 1 according to the present invention may be used in the form of a pharmaceutically acceptable salt derived from an inorganic or organic acid, and preferred pharmaceutically acceptable salts may include at least one selected from the group consisting of hydrochloric acid, hydrobromic acid, sulfuric acid, phosphoric acid, nitric acid, acetic acid, glycolic acid, lactic acid, pyruvic acid, malonic acid, succinic acid, glutaric acid, fumaric acid, malic acid, mandelic acid, tartaric acid, citric acid, ascorbic acid, palmitic acid, maleic acid, hydroxymaleic acid, benzoic acid, hydroxybenzoic acid, phenylacetic acid, cinnamic acid, salicylic acid, methanesulfonic acid, benzenesulfonic acid, and toluenesulfonic acid.

The compound of Formula 1 according to the present invention or a pharmaceutically acceptable salt thereof may include a hydrate and a solvate. The hydrate may be formed by bonding the compound of Formula 1 with a water molecule.

Specifically, the pharmaceutically acceptable salt of the pyridinyl triazine derivative compound represented by Formula 1 according to the present invention may be prepared by a conventional method known in the art. The pharmaceutically acceptable salt should have low toxicity to humans and should not adversely affect biological activity or physicochemical properties of the parent compound. Free acids that can be used to prepare the pharmaceutically acceptable salt may be classified into inorganic acids and organic acids. The inorganic acids include hydrochloric acid, sulfuric acid, nitric acid, phosphoric acid, perchloric acid, hydrobromic acid, and the like. The organic acids include acetic acid, methanesulfonic acid, ethanesulfonic acid, p-toluenesulfonic acid, fumaric acid, maleic acid, malonic acid, phthalic acid, succinic acid, lactic acid, citric acid, gluconic acid, tartaric acid, salicylic acid, malic acid, oxalic acid, benzoic acid, embonic acid, aspartic acid, glutamic acid, and the like. Organic bases that can be used in the preparation of organic base addition salts include tris(hydroxymethyl)methylamine, dicyclohexylamine, and the like. Amino acids that can be used to prepare the amino acid addition base include natural amino acids such as alanine and glycine.

The pyridinyl triazine derivative compound represented by Formula 1 according to the present invention includes all hydrates and solvates in addition to the pharmaceutically acceptable salts described above. The hydrates and solvates are obtained by dissolving the pyridinyl triazine derivative compound represented by Formula 1 in a water-miscible solvent such as methanol, ethanol, acetone, and 1,4-dioxane, adding a free acid or a free base thereto, and performing crystallization or recrystallization. In such cases, solvates (especially hydrates) may be formed. Accordingly, the compound of the present invention includes stoichiometric solvates including hydrates, in addition to various amounts of water-containing compounds that can be prepared using a method such as freeze-drying.

In another aspect, the present invention provides a pharmaceutical composition for preventing, alleviating, or treating cancer containing, as an active ingredient, a compound selected from a pyridinyl triazine derivative compound represented by Formula 1 according to the present invention, a pharmaceutically acceptable salt thereof, a hydrate thereof, a solvate thereof, and a stereoisomer thereof.

The pharmaceutical composition according to the present invention has excellent ability to inhibit the activity of protein kinase. The protein kinase may specifically include CDK4, CDK6, CLK2, DDR1, FGFR1, FGFR2, FGFR3, FGFR4, FMS, IRAK1, LCK, LYN, MAK, MPSK1, PCTAIRE1, PCTAIRE2, PHKg1, ROS, TAO2, TRKA, and the like.

Therefore, the pharmaceutical composition of the present invention may be used for treating, preventing, and alleviating cancer caused by abnormal cell growth. The types of cancer that can be prevented, treated, or alleviated through treatment with the pharmaceutical composition of the present invention include bladder cancer, breast cancer, melanoma, endometrial cancer, stomach cancer, lung cancer, liver cancer, colon cancer, small intestine cancer, pancreatic cancer, brain cancer, bone cancer, sclerosing adenoma, head and neck cancer, esophageal cancer, thyroid cancer, parathyroid cancer, kidney cancer, sarcoma, prostate cancer, urethral cancer, leukemia, multiple myeloma, blood cancer (including leukemia, multiple myeloma, and myelodysplastic syndrome), lymphoma (including Hodgkin's disease and non-Hodgkin's lymphoma), fibroadenoma, and the like.

In particular, the pharmaceutical composition of the present invention exhibits superior inhibitory activity not only against FGFR kinase, but also against V561M point mutation FGFR1 kinase, V564F point mutation FGFR2 kinase, N549H point mutation FGFR2 kinase, V555M point mutation FGFR3 kinase, K650M point mutation FGFR3 kinase, and K650M point mutation FGFR3 kinase, and also exhibits excellent inhibitory activity against cellular activity of UMUC3, AN3-CA, J82 and KMS-11 cell lines, that is, inhibits proliferation of cancer cell lines, thus being useful as a therapeutic agent for preventing, alleviating or treating various cancers such as bladder cancer, breast cancer, and melanoma.

Preferably, the onset of cancer is mediated by a protein kinase. More preferably, the protein kinase includes at least one selected from FGFR, FGFR1 V561M, FGFR2 V564F, FGFR2 N549H, FGFR3 V555M, FGFR3 K650M, and FGFR3 K650E.

In an embodiment, the result of analysis of the inhibitory activity against protein kinases of novel pyridinyl triazine derivative compounds designed as FGFR kinase inhibitors showed that the pyridinyl triazine derivative compounds exhibit excellent inhibitory activity against kinases such as CDK4, CDK6, CLK2, DDR1, FGFR1, FGFR2, FGFR3, FGFR4, FMS, IRAK1, LCK, LYN, MAK, MPSK1, PCTAIRE1, PCTAIRE2, PHKg1, ROS, TAO2, and TRKA (Experimental Example 1).

In addition, the result of verification of anticancer effect of the novel pyridinyl triazine derivative compound on AN3-CA cells, which is a uterine cancer cell line showed that the pyridinyl triazine derivative compound exhibited excellent inhibitory activity against the proliferation of AN3-CA cells (Experimental Example 2).

In addition, the novel pyridinyl triazine derivative compounds have excellent inhibitory activity against V561M point mutation FGFR1 kinase, V564F point mutation FGFR2 kinase, N549H point mutation FGFR2 kinase, V555M point mutation FGFR3 kinase, K650M point mutation FGFR3 kinase, and K650E point mutation FGFR3 kinase, and excellent inhibitory activity against cell activity of bladder cancer cell lines UMUC3 and J82, breast cancer cell line AN3-CA, and myeloma cell line KMS-11 (Experimental Example 3).

In addition, animal models transplanted with the bladder cancer cell line orally administered with the novel pyridinyl triazine derivative compound exhibited an excellent effect of reducing a tumor volume, that is, an excellent anticancer effect (Experimental Example 7).

As described above, the novel pyridinyl triazine derivative according to the present invention is an activity inhibitor selective for kinase and mutant kinase, and has high inhibitory activity and an antiproliferative effect selective for various forms of cancer such as bladder cancer, breast cancer, and myeloma, and can be used as a composition for the treatment of cancer, which is a disease caused by abnormal cell growth.

In an embodiment, the pharmaceutical composition is administered to a patient that has one or more of an FGFR gene, V561M mutant FGFR1 gene, V564F mutant FGFR2 gene, N549H mutant FGFR2 gene, V555M mutant FGFR3 gene, K650M mutant FGFR3 gene, and K650E mutant FGFR3 gene.

The pharmaceutical composition may be applied to experimental animals such as mice, rabbits, rats, guinea pigs or hamsters, preferably primates including humans, more preferably humans, without being limited thereto.

As used herein, the term "treatment" includes alleviating or ameliorating symptoms, reducing the extent of a disease, delaying or alleviating disease progression, ameliorating, alleviating, or stabilizing a disease, partial or full recovery, prolonging survival, and other beneficial treatment results.

In addition, as used herein, treatment of cancer means treatment of all cancer cells, and the cancer includes angiogenesis of endothelial cells and mitosis thereof (solid tumors, tumor metastasis, and benign tumors). For example, the cancer includes, but is not limited to, breast cancer, ovarian cancer, cervical cancer, prostate cancer, testicular cancer, genitourinary cancer, esophageal cancer, laryngeal cancer, glioblastoma, stomach cancer, skin cancer, keratoacanthomas, lung cancer, squamous cell carcinoma, large cell carcinoma, small cell carcinoma, lung adenocarcinoma, bone cancer, colon cancer, adenoma, pancreatic cancer, adenocarcinoma, carcinogenic cancer, follicular carcinoma, undifferentiated cancer, papillary cancer, normal hematoma, melanoma, sarcoma, bladder cancer, liver cancer and bile duct cancer, kidney cancer, myeloid disease, lymphoid disease, Hodgkin's disease, hair cell cancer, oral cavity cancer, pharyngeal (oral) cancer, lip cancer, tongue cancer, small intestine cancer, colorectal cancer, colon cancer, rectal cancer, brain cancer, central nervous system cancer, leukemia, hemangioma, trachoma, and purulent sarcoma.

The content of the active ingredient, namely, the compound represented by Formula 1 above, the pharmaceutically acceptable salt thereof, the hydrate thereof, the solvate thereof, and the stereoisomer thereof, is appropriately adjusted by selection by those skilled in the art according to the use mode and use method of the pharmaceutical composition of the present invention.

For example, the compound selected from the compound represented by Formula 1, the pharmaceutically acceptable salt thereof, the hydrate thereof, the solvate thereof and the stereoisomer thereof may be present in an amount of 0.1 to 10% by weight, more preferably 0.5 to 5% by weight, based on the total weight of the pharmaceutical composition.

The compound selected from the compound represented by Formula 1, the pharmaceutically acceptable salt thereof, the hydrate thereof, the solvate thereof and the stereoisomer thereof may be present in the pharmaceutical composition alone or in combination with a pharmacologically acceptable carrier, excipient, diluent, or sub-component.

Examples of the pharmaceutically acceptable carrier, excipient, and diluent include, but are not limited to, one or more selected from the group consisting of lactose, dextrose, sucrose, sorbitol, mannitol, xylitol, erythritol, maltitol, starch, acacia rubber, alginate, gelatin, calcium phosphate, calcium silicate, cellulose, methyl cellulose, microcrystalline cellulose, polyvinyl pyrrolidone, water, methylhydroxybenzoate, propylhydroxybenzoate, talc, magnesium stearate, mineral oil, dextrin, calcium carbonate, propylene glycol, liquid paraffin, and physiological saline, and a common carrier, excipient, or diluent may be used. In addition, the pharmaceutical composition may further include a conventional filler, extender, binder, disintegrating agent, anticoagulant, lubricant, wetting agent, pH adjusting agent, nutrient, vitamin, electrolyte, alginic acid or salt thereof, pectic acid or salt thereof, protective colloid, glycerin, fragrance, emulsifier, preservative, or the like.

When administered in combination with another anticancer drug for treating cancer or tumors, the compound selected from the compound represented by Formula 1, the pharmaceutically acceptable salt thereof, the hydrate thereof, the solvate thereof, and the stereoisomer thereof can improve an effect of treatment with the anticancer drug.

Specifically, the pharmaceutical composition may further contain at least one other anti-cancer agent or therapeutic agent known to be effective for treating or preventing cancer, in addition to the active ingredient, and thus may be used as a simultaneously or separately applied combination therapy. Other anti-cancer agents or therapeutic agents that may be applied to combination therapy may include, for example, at least one compound selected from the group consisting of Gleevec® (imatinib), Sutent® (sunitinib), Herceptin® (trastuzumab), Velcade® (bortezomib), dexamethasone, Nexavar® (sorafenib), aromatase inhibitors, and kinase inhibitors, but are not limited thereto.

The pharmaceutical composition may be administered orally or parenterally, and for example, may be administered through various routes including oral, transdermal, subcutaneous, intravenous, or intramuscular routes. In addition, the formulation of the composition may vary depending on the method of use, and may be formulated using methods well known in the art to provide rapid, sustained, or delayed release of the active ingredient after administration to a mammal. In general, solid preparations for oral administration include tablets, troches, soft or hard capsules, pills, powders, granules, and the like. These preparations can be prepared, for example, by mixing starch, calcium carbonate, sucrose, lactose, gelatin, or the like. In addition, lubricants such as magnesium stearate and talc may also be used, in addition to simple excipients. Liquid preparations for oral administration include suspensions, liquids and solutions, emulsions, syrups, and the like. In addition to water and liquid paraffin, which are common simple diluents, various excipients such as wetting agents, sweeteners, fragrances, and preservatives may be included. Formulations for parenteral administration include creams, lotions, ointments, plasters, liquids and solutions, aerosols, fluid extracts, elixirs, infusions, sachets, patches, injections, and the like. Injection formulations may be preferably in the form of an isotonic aqueous solution or suspension.

The pharmaceutical composition may further contain an adjuvant such as a sterilizer, a preservative, a stabilizer, a hydrating agent or an emulsifying accelerator, a salt and/or a buffer for controlling osmotic pressure, and other therapeutically useful substances. Alternatively, the pharmaceutical composition may be formulated in accordance with an ordinary mixing, granulation, or coating method or using a suitable method known in the art.

In addition, the dosage of the pharmaceutical composition may be determined in consideration of the administration method, the age, gender, disease severity, and condition of the patient, the rate of absorption of the active ingredient in the body, and the inactivation rate of the active ingredient and drugs used in combination therewith, and the pharmaceutical composition may be administered once or multiple times in a portionwise manner. The active ingredient of the pharmaceutical composition is preferably orally or parenterally administered to a mammal including a human in an amount of 0.001 to 100 mg/kg body weight, preferably 0.01 to 35 mg/kg body weight, on a daily basis, and may be administered once or divided into multiple administrations throughout the day.

In another aspect, the present invention provides a method of treating cancer including administering a therapeutically effective amount of the compound selected from the compound represented by Formula 1, the pharmaceutically acceptable salt thereof, the hydrate thereof, the solvate thereof and the stereoisomer thereof.

Preferably, the treatment method may further include identifying a patient in need of prevention or treatment of cancer before the administration.

As used herein, the term "therapeutically effective amount" means an amount of an active ingredient which is effective for the prevention or treatment of cancer in a mammal, and the therapeutically effective amount may be controlled by a variety of factors such as the type of disease, the severity of the disease, the type and content of the active ingredient and other ingredients contained in the composition, the type of formulation, the age, weight, general state of health, gender, and diet of the patient, the time of administration, the route of administration, clearance rate of the composition in blood, the duration of treatment, and drugs used simultaneously therewith. However, preferably, as described above, the compound may be administered in an amount of 0.001 to 100 mg/kg body weight, preferably 0.01 to 35 mg/kg body weight, on a daily basis, once or multiple times in a portionwise manner a day, by oral or parenteral routes.

In another aspect, the present invention provides a method of preparing a compound selected from a pyridinyl triazine derivative compound represented by the following Formula 1, a pharmaceutically acceptable salt thereof, a hydrate thereof, a solvate thereof, and a stereoisomer thereof, as shown in the following Reaction Schemes 1 to 4, the method including:

1) reacting a compound represented by Formula 6 with a compound represented by Formula 7 to prepare a compound represented by Formula 8;

2) cleaving the compound represented by Formula 8 to prepare a compound represented by Formula 9;

3) subjecting the compound represented by Formula 9 to a substitution reaction to prepare a compound represented by Formula 10; and 4) reacting the compound represented by Formula 10 with an amine compound represented by Formula 11 to prepare the pyridinyl triazine derivative compound represented by Formula 1.

[equation 1]

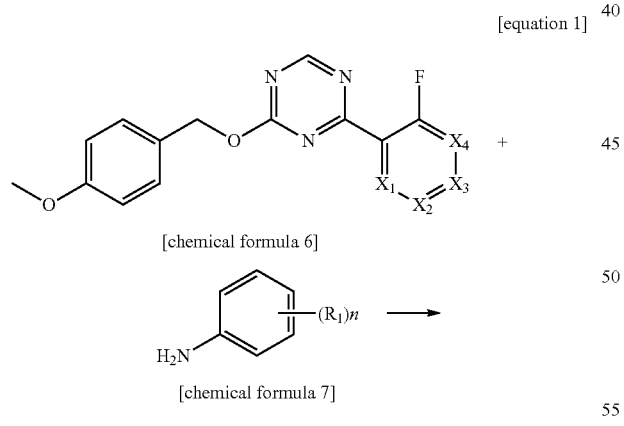

[chemical formula 6]

[chemical formula 7]

[chemical formula 8]

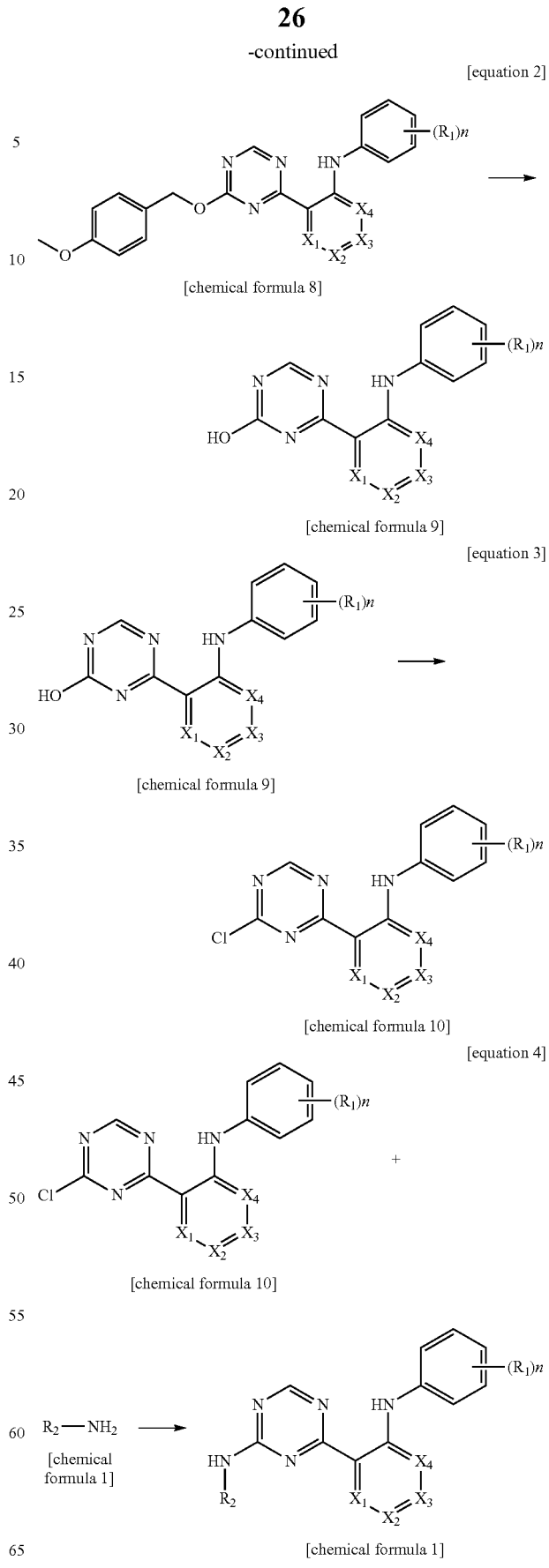

[chemical formula 8]

[equation 2]

[chemical formula 9]

[equation 3]

[chemical formula 9]

[chemical formula 10]

[equation 4]

[chemical formula 10]

[chemical formula 1]

[chemical formula 1]

In Reaction Schemes 1 to 4, $X_1$, $X_2$, $X_3$, $X_4$, $R_1$, $R_2$ and n are each as defined in Formula 1 of claim 1 above.

The method of preparing the compound selected from the pyridinyl triazine derivative compound represented by Formula 1, the pharmaceutically acceptable salt thereof, the hydrate thereof, the solvate thereof, and the stereoisomer thereof will be described in detail as follows.

The preparation method will be described in detail with reference to Reaction Scheme 5 including a series of steps of Reaction Scheme 1 to Reaction Scheme 4.

As shown in the following Reaction Scheme 5, the method of preparing the compound selected from the pyridinyl triazine derivative compound represented by Formula 1 of the present invention, a pharmaceutically acceptable salt thereof, a hydrate thereof, a solvate thereof, and a stereoisomer thereof, the method includes:

1) reacting a compound represented by Formula 2 with a compound represented by Formula 3 to prepare a compound represented by Formula 4;
2) reacting the compound represented by Formula 4 with a compound represented by Formula 5 to prepare a compound represented by Formula 6;
3) reacting the compound represented by Formula 6 with the compound represented by Formula 7 to prepare a compound represented by Formula 8;
4) cleaving the compound represented by Formula 8 to prepare a compound represented by Formula 9;
5) subjecting the compound represented by Formula 9 to a substitution reaction to prepare a compound represented by Formula 10; and
6) reacting the compound represented by Formula 10 with an amine compound represented by Formula 11 to prepare the pyridinyl triazine derivative compound represented by Formula 1.

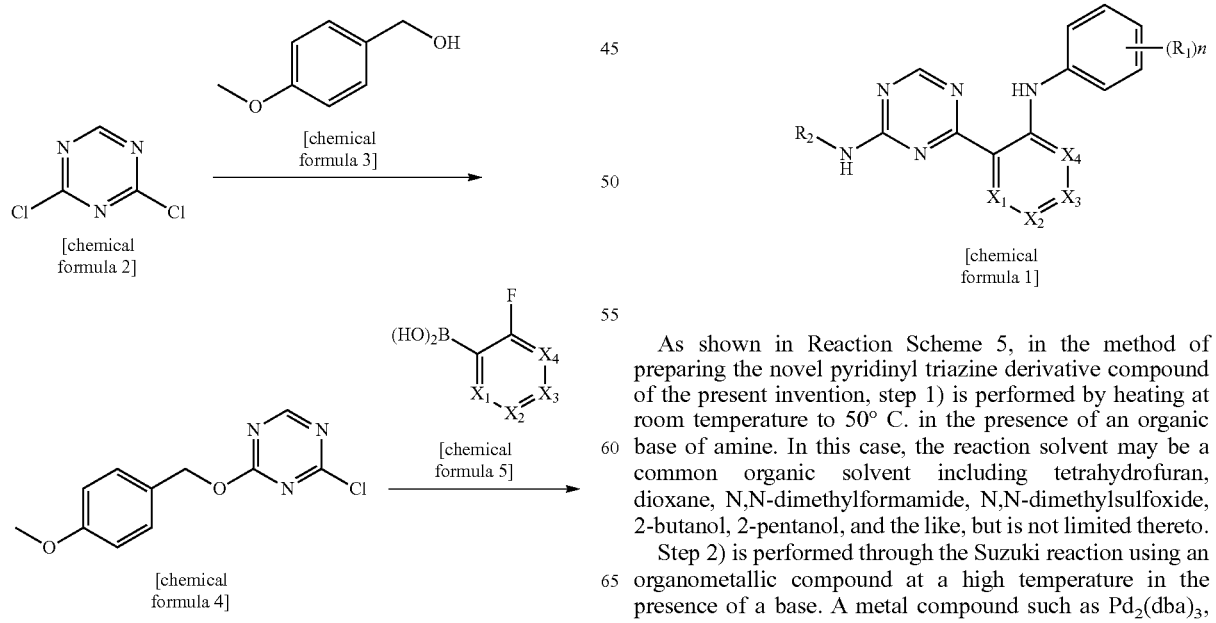

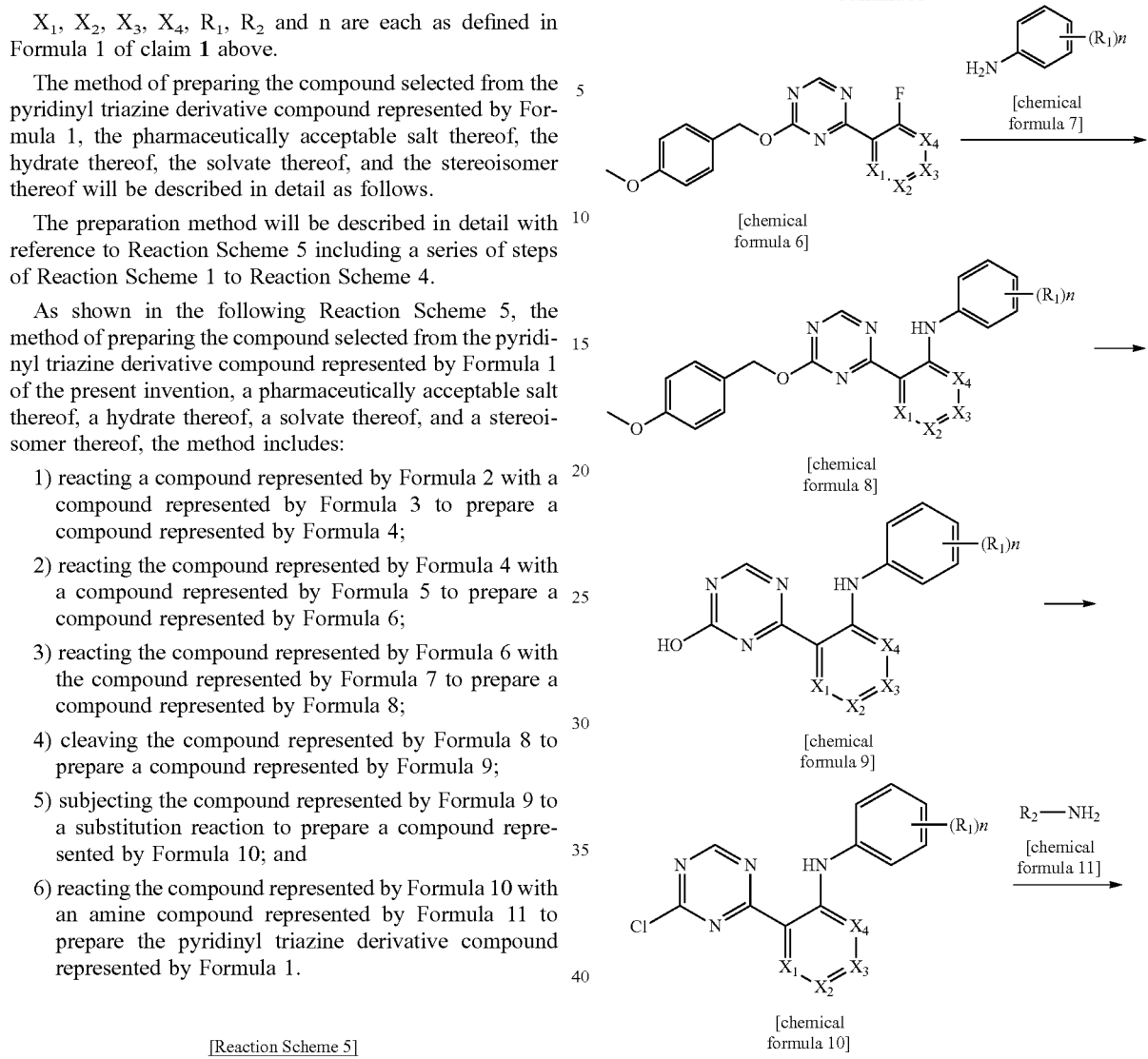

As shown in Reaction Scheme 5, in the method of preparing the novel pyridinyl triazine derivative compound of the present invention, step 1) is performed by heating at room temperature to 50° C. in the presence of an organic base of amine. In this case, the reaction solvent may be a common organic solvent including tetrahydrofuran, dioxane, N,N-dimethylformamide, N,N-dimethylsulfoxide, 2-butanol, 2-pentanol, and the like, but is not limited thereto.

Step 2) is performed through the Suzuki reaction using an organometallic compound at a high temperature in the presence of a base. A metal compound such as $Pd_2(dba)_3$, $Pd(Oac)_2$, $PdCl_2(PPh_3)_2$, or $Pd(PPh_3)_4$ may be used in the Suzuki reaction, but the present invention is not limited thereto. The ligand used herein may be xantphos (CAS number: 161265-03-8), DavePhos (CAS number: 213697-53-1), JohnPhos (CAS number: 224311-51-7), X-phos (CAS number: 564483-18-7), tert-butyl Xphos (CAS number: 564483-19-8) or the like, but is not limited thereto. In addition, the base used herein may be organic bases of amines, carbonates, sulfates, phosphates, and alkoxides of alkali metals or alkaline earth metals, and the like, but is not limited thereto. In addition, the reaction solvent used herein may be a common organic solvent including tetrahydrofuran, dioxane, N,N-dimethylformamide, N,N-dimethylsulfoxide, 2-butanol, 2-pentanol, or the like, but is not limited thereto. The reaction temperature is in the range of 50° C. to 200° C., and is preferably maintained in the range of 80° C. to 150° C.

Step 3) corresponds to Reaction Scheme 1 and is performed at 0° C. to room temperature in the presence of an inorganic base of an alkali metal salt selected from an alkali metal hydride, alkali metal hydroxide, and the like. The reaction solvent used herein may be a conventional organic solvent including tetrahydrofuran, dioxane, N,N-dimethylformamide, N,N-dimethylsulfoxide, 2-butanol, or 2-pentanol, but is not limited thereto.

Step 4) corresponds to Reaction Scheme 2, and is performed at room temperature in the presence of an alkali metal organic acid catalyst. The reaction solvent used herein may be a conventional organic solvent including dichloromethane, dichloroethane, tetrahydrofuran, and the like, but is not limited thereto.

Step 5) corresponds to Reaction Scheme 3 and is performed by heating at 60° C. to 110° C. in the presence of a phosphoryl chloride.

Step 6) corresponds to Reaction Scheme 4 and is performed by heating at room temperature to 80° C. in the presence of an amine base. The reaction solvent used herein may be a conventional organic solvent including tetrahydrofuran, dioxane, N,N-dimethylformamide, N,N-dimethylsulfoxide, 2-butanol, 2-pentanol, or the like, but is not limited thereto.

MODE FOR INVENTION

Hereinafter, the present invention will be described in more detail with reference to Examples, Preparation Examples, and Experimental Examples. However, the following Examples, Preparation Examples, and Experimental Examples are provided only for better understanding of the present invention, and should not be construed as limiting the scope of the present invention.

In addition, those skilled in the art to which the present invention pertains can prepare the target compound using various methods based on the structure of Formula 1, and all of these methods should be interpreted as falling within the scope of the present invention. That is, the compound of the present invention can be prepared using an arbitrary combination of synthetic methods described in detail in the following examples or various synthetic methods disclosed in the prior art, which are understood to fall within the scope of the present invention, and the specific examples below should not be construed as limiting the preparation of the compound of the present invention.

[Example] Synthesis of Compounds Inhibiting Protein Kinase

Example 1: 4-(2-((2-((2,6-dichloro-3,5-dimethoxyphenyl)amino)pyridin-3-yl)-N-(4-(4-ethylpiperazin-1-yl)phenyl)-1,3,5-triazin-2-amine (Compound No. 1)

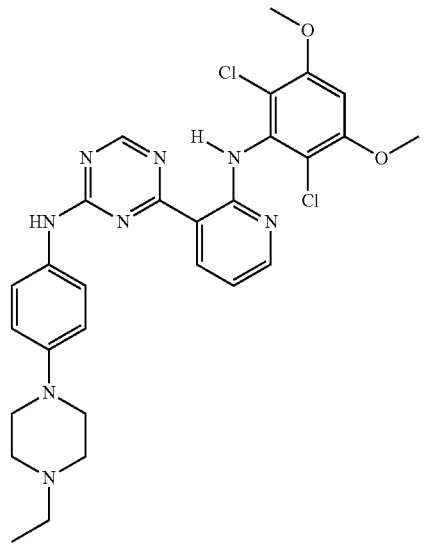 [SMILES: CCN1CCN(c2ccc(Nc3ncnc(-c4cccnc4Nc4c(Cl)c(OC)cc(OC)c4Cl)n3)cc2)CC1]

The compound of Example 1 represented by the structural formula above can be manufactured through the following manufacturing process.

Step 1: N-(3,5-dimethoxyphenyl)acetamide

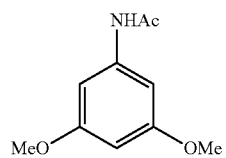 [SMILES: COc1cc(NC(C)=O)cc(OC)c1]

Acetic anhydride (63 mL, 653.3 mmol) was slowly added dropwise to a solution of 3,5-dimethoxyaniline (95 g, 622.2 mmol) in toluene (500 mL) for 15 minutes, and the resulting mixture was stirred until the 3,5-dimethoxyaniline disappeared while heating to 35 to 45° C. The resulting gray suspension was diluted with hexane (200 mL), and the resulting precipitate was collected by filtration. The resulting solid was washed with toluene/hexane (2:1, 200 mL) and hexane (100 mL) and dried to obtain the target compound (72.0 g, 56.9% yield) as a colorless solid. MS m/z 196 [M+H]$^+$.

Step 2:
N-(2,6-dichloro-3,5-dimethoxyphenyl)acetamide

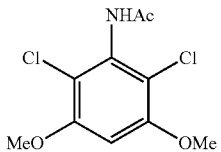 [SMILES: COc1cc(OC)c(Cl)c(NC(C)=O)c1Cl]

N-(3,5-dimethoxyphenyl)acetamide (30.0 g, 153 mmol) was added to a round-bottom flask, which was then filled with argon gas. The reactant was dissolved in acetonitrile (500 mL), and then sulfuryl chloride (SO$_2$Cl$_2$, 25 mL, 300 mmol) was slowly added dropwise thereto at 0° C. for 7 minutes. The reaction mixture was stirred at 0° C. for 30 minutes, and a saturated sodium hydrogen carbonate solution (250 mL) was slowly added dropwise thereto to terminate the reaction. Then, the mixture was extracted several times using ethyl acetate, and the organic layer was washed with water and saturated sodium chloride solution, dried over sodium sulfate, and then concentrated. The obtained filtrate was purified by chromatography (ethyl acetate/hexane, 1:1-2:1) to obtain the title compound (15.0 g, 37.2% yield) as a colorless solid. MS m/z: 264 [M+H]$^+$.

Step 3: 2,6-dichloro-3,5-dimethoxyaniline

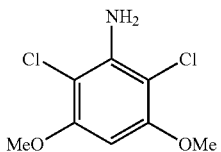

A 2N aqueous potassium hydroxide solution (150 mL) was added to a solution of N-(2,6-dichloro-3,5-dimethoxyphenyl)acetamide (15 g, 48 mmol) in ethanol (200 mL), and then the reaction mixture was stirred under reflux at 90° C. for 2 days. The mixed solution was cooled to room temperature, then cooled to 0° C. using ice water, and further stirred for 1 hour. The resulting solid was filtered, washed with a cold ethanol/water (1:1) mixed solvent, and dried to obtain the target compound (7.6 g, 71% yield). MS m/z: 222 [M+H]$^+$.

Step 4:
2-chloro-4-((4-methoxybenzyl)oxy)-1,3,5-triazine

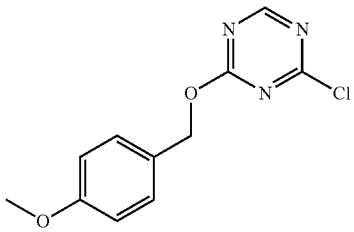 [SMILES: COc1ccc(COc2ncnc(Cl)n2)cc1]

2,4-dichloro-1,3,5-triazine (150 mg, 1 mmol) was dissolved in a solution of N,N-diisoitylamine (155 mg, 1.2 mmol) in tetrahydrofuran (2 mL), (4-methoxyphenyl)methanol (138 mg, 1 mmol) was slowly added dropwise thereto, and the reaction mixture was stirred at room temperature for 2 hours. Then, the reaction solution was extracted several times using dichloromethane, and the obtained organic layer was washed with water and saturated sodium chloride solution, dried over magnesium sulfate, and concentrated. The obtained filtrate was purified by chromatography (ethyl acetate/hexane, 10:1) to obtain the target compound (60 mg) as a colorless solid, which was used immediately for the subsequent reaction.

Step 5: 2-(2-fluoropyridin-3-yl)-4-((4-methoxybenzyl)oxy)-1,3,5-triazine

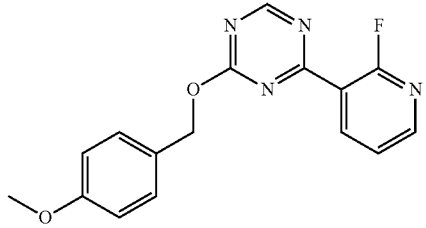 [SMILES: COc1ccc(COc2ncnc(-c3cccnc3F)n2)cc1]

2-chloro-4-((4-methoxybenzyl)oxy)-1,3,5-triazine (250 mg, 1.0 mmol) obtained in Step 4 and [1,1'-bis(diphenylphosphino) ferrocene]dichloropalladium (II) (20 mg) were changed in a round bottom flask, a solution of (2-fluoropyridin-3-yl) boronic acid (140 mg, 1.0 mmol) in 1,4-dioxane (5 mL) and an aqueous solution (2.0 mL) of cesium carbonate (650 mg, 2.0 mmol) were slowly added dropwise thereto, and the reaction mixture was stirred at 100° C. for 1 hour. The mixed solution was cooled to room temperature, dried, and concentrated. The obtained residue was purified by column chromatography (petroleum ether/ethyl acetate, 100:0-3:1) to obtain the title compound (150 mg, 48% yield) as a yellow solid. MS m/z: 312 [M+H]$^+$.

Step 6: N-(2,6-dichloro-3,5-dimethoxyphenyl)-3-(4-((4-methoxybenzyl)oxy)-1,3,5-triazin-2-yl)pyridin-2-amine

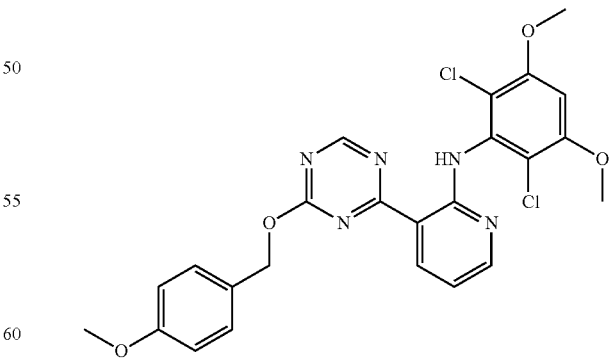

The 2,6-dichloro-3,5-dimethoxyaniline (150 mg, 0.5 mmol) obtained in step 3 and a lithium bis(trimethylsilyl) amide solution (1 M/L in tetrahydrofuran, 0.5 mL) were added to 7 mL of a solution of 2-(2-fluoropyridin-3-yl)-4-((4-methoxybenzyl)oxy)-1,3,5-triazine (110 mg, 0.5 mmol)

obtained in step 5 in tetrahydrofuran, followed by stirring at room temperature for 24 hours. The resulting yellow suspension was diluted with diethyl ether (10 mL), and the resulting precipitate was obtained by filtration. The resulting solid was washed with diethyl ether (10 mL) and dried to obtain the target compound (140 mg, 55% yield) as a yellow solid. MS m/z: 514 [M+H]+.

Step 7: 4-(2-((2,6-dichloro-3,5-dimethoxyphenyl) amino)pyridin-3-yl)-1,3,5-triazin-2-ol

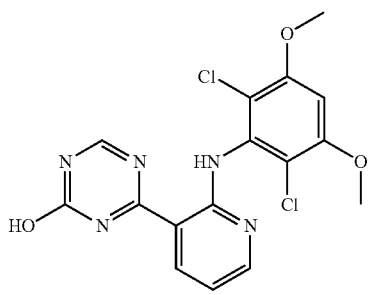 [SMILES: COc1cc(OC)c(Cl)c(Nc2ncccc2-c2ncnc(O)n2)c1Cl]

Trifluoroacetic acid (1.0 mL) was added to the solution of N-(2,6-dichloro-3,5-dimethoxyphenyl)-3-(4-((4-methoxybenzyl)oxy)-1,3,5-triazin-2-yl)pyridin-2-amine (140 mg, 0.27 mmol) in dichloromethane (3.0 mL) obtained in Step 6, followed by stirring at room temperature for 2 hours. Then, the reaction solution was extracted several times with a sodium hydrogen carbonate solution and dichloromethane, and the obtained organic layer was washed with water and a saturated sodium chloride solution, dried with magnesium sulfate, and concentrated to obtain the target compound as a yellow solid (100 mg, 90% yield). MS m/z: 394 [M+H]+.

Step 8: 3-(4-chloro-1,3,5-triazin-2-yl)-N-(2,6-dichloro-3,5-dimethoxyphenyl)pyridin-2-amine

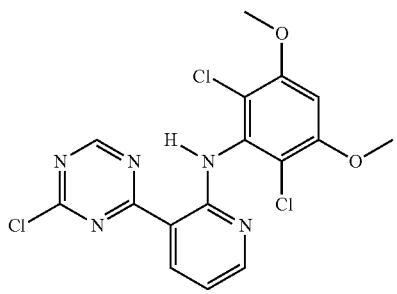 [SMILES: COc1cc(OC)c(Cl)c(Nc2ncccc2-c2ncnc(Cl)n2)c1Cl]

The 4-(2-((2,6-dichloro-3,5-dimethoxyphenyl)amino) pyridin-3-yl)-1,3,5-triazin-2-ol (100 mg, 0.25 mmol) obtained in Step 7 was stirred in a POCL3 (3.0 mL) solution at a temperature of 110° C. for 2 hours. Then, the mixture was neutralized and the precipitate was obtained by filtration. Then, the solid was washed with water and dried to obtain the target compound (70 mg, 70, yield) as a yellow solid. MS m/z: 414 [M+H]+.

Step 9: 4-(2-((2-((2,6-dichloro-3,5-dimethoxyphenyl)amino)pyridin-3-yl)-N-(4-(4-ethylpiperazin-1-yl)phenyl)-1,3,5-triazin-2-amine

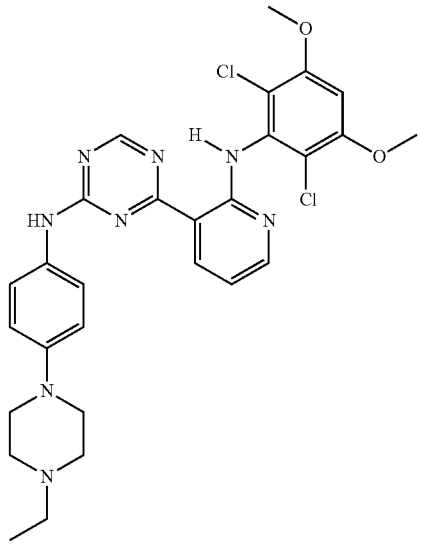 [SMILES: CCN1CCN(c2ccc(Nc3ncnc(-c4cccnc4Nc4c(Cl)c(OC)cc(OC)c4Cl)n3)cc2)CC1]

The 3-(4-chloro-1,3,5-triazin-2-yl)-N-(2,6-dichloro-3,5-dimethoxyphenyl)pyridin-2-amine (100 mg, 0.243 mmol) obtained in Step 8, 4-(4-ethylpiperazin-1-yl)aniline (74 mg, 0.364 mmol), and potassium carbonate (100 mg, 0.727 mmol) were dissolved in a N,N-dimethylformamide (0.2 mL) solution. The resulting solution was heated to a temperature of 80° C. and then stirred for 1 hour. After the reaction was completed, the reaction solution was cooled to room temperature and extracted with ethyl acetate several times, and the obtained organic layer was washed with water and saturated sodium chloride solution, dried over sodium sulfate, and then concentrated. The obtained residue was purified through column chromatography (dichloromethane/methanol, 20:1) to obtain the target compound (56 mg, 59% yield) as a yellow solid. $^1$H NMR (400 MHz, CDCl$_3$) δ 10.74 (brs, 1H), 8.81 (dd, J=7.8, 2.0 Hz, 1H), 8.70 (s, 1H), 8.23 (dd, J=4.6, 2.0 Hz, 1H), 7.41 (s, 1H), 7.35 (brs, 2H), 6.76 (dd, J=7.8, 4.6 Hz, 1H), 6.52 (s, 1H), 3.93 (s, 6H), 3.20-3.01 (m, 4H), 2.57 (m, 4H), 2.08 (q, J=7.2 Hz, 2H) 1.13 (t, J=7.2 Hz, 3H). MS m/z 581 [M+H]+.

Example 2: 4-(2-((2,6-dichloro-3,5-dimethoxyphenyl)amino)pyridin-3-yl)-1,3,5-triazin-2-amine (Compound No. 2)

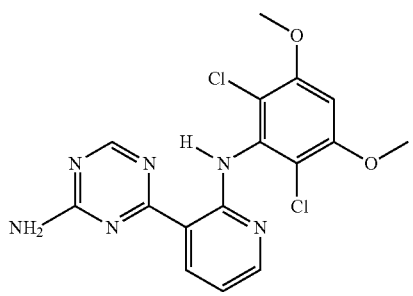 [SMILES: COc1cc(OC)c(Cl)c(Nc2ncccc2-c2ncnc(N)n2)c1Cl]

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and ammonium hydroxide. $^1$H NMR (400 MHz, CDCl$_3$) δ 11.07 (s, 1H), 8.79 (dd, J=8.0, 2.0 Hz, 1H), 8.69 (s, 1H), 8.26 (dd, J=4.8, 2.0 Hz, 1H), 6.79 (dd, J=8.0, 4.8 Hz, 1H), 6.53 (s, 1H), 5.44 (s, 2H), 3.95 (s, 6H). MS m/z: 393 [M+H]$^+$.

Example 3: N$^1$-(4-(2-((2,6-dichloro-3,5-dimethoxyphenyl)amino)pyridin-3-yl)-1,3,5-triazin-2-yl)-N$^2$,N$^2$-dimethylethane-1,2-diamine (Compound No. 3)

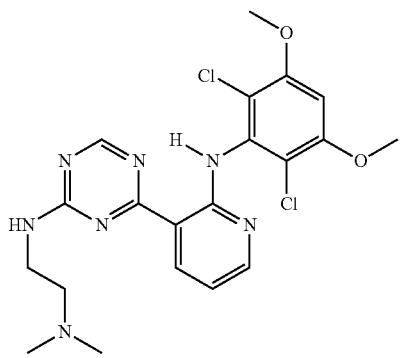

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and N$^1$,N$^1$-dimethylethane-1,2-diamine. $^1$H NMR (400 MHz, CDCl$_3$) (mixture of rotamer) δ 11.12 (s, 1H), 8.83 (dd, J=8.0, 2.0 Hz, 0.6H), 8.77 (dd, J=8.0, 2.0 Hz, 0.4H), 8.67 (s, 0.4H), 8.58 (s, 0.6H), 8.25 (dd, J=4.8, 2.0 Hz, 0.6H), 8.24 (dd, J=4.8, 2.0 Hz, 0.4H), 6.79 (dd, J=8.0, 4.8 Hz, 0.6H), 6.77 (dd, J=8.0, 4.8 Hz, 0.4H), 6.54 (s, 1H), 6.23 (s, 0.6H), 6.08 (s, 0.4H), 3.95 (s, 6H), 3.59-3.54 (m, 2H), 2.56-2.53 (m, 2H), 2.29 (s, 2H), 2.26 (s, 4H). MS m/z: 464 [M+H]$^+$.

Example 4: 4-(2-((2,6-dichloro-3,5-dimethoxyphenyl)amino)pyridin-3-yl)-N-phenyl-1,3,5-triazin-2-amine (Compound No. 4)

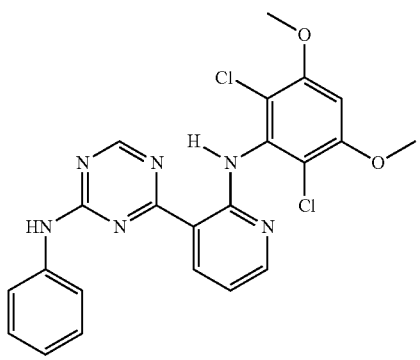 [SMILES: COc1cc(OC)c(Cl)c(Nc2ncccc2-c2ncnc(Nc3ccccc3)n2)c1Cl]

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and aniline. $^1$H NMR (400 MHz, CDCl$_3$) δ 10.95 (s, 1H), 8.83 (dd, J=8.0, 2.0 Hz, 1H), 8.78 (s, 1H), 8.27 (dd, J=4.4, 2.0 Hz, 1H), 7.58 (m, 2H), 7.37 (s, 2H), 7.32 (s, 2H), 7.11 (s, 1H), 6.80 (dd, J=8.0, 4.4 Hz, 1H), 6.55 (s, 1H), 3.95 (s, 6H). MS m/z: 469 [M+H]$^+$.

Example 5: 4-(2-((2-((2,6-dichloro-3,5-dimethoxyphenyl)amino)pyridin-3-yl)-N-(2-methoxyphenyl)-1,3,5-triazin-2-amine (Compound No. 5)

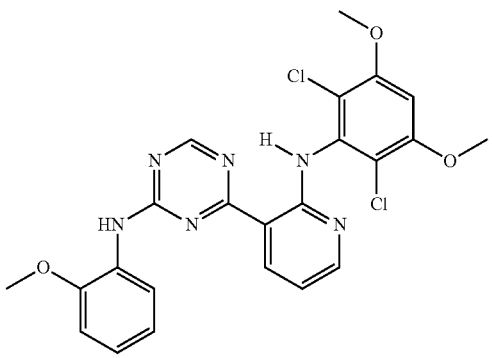

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 2-methoxyaniline. $^1$H NMR (400 MHz, CDCl$_3$) δ 11.03 (s, 1H), 8.84 (dd, J=7.6, 2.0 Hz, 1H), 8.79 (s, 1H), 8.32 (s, 1H), 8.27 (dd, J=4.8, 2.0 Hz, 1H), 7.84 (s, 1H), 7.06 (m, 1H), 6.93 (m, 2H), 6.81 (dd, J=7.6, 4.8 Hz, 1H), 6.55 (s, 1H), 3.95 (s, 6H), 3.92 (s, 3H). MS m/z: 499 [M+H]$^+$.

Example 6: 4-(2-((2-((2,6-dichloro-3,5-dimethoxyphenyl)amino)pyridin-3-yl)-N-(3-methoxyphenyl)-1,3,5-triazin-2-amine (Compound No. 6)

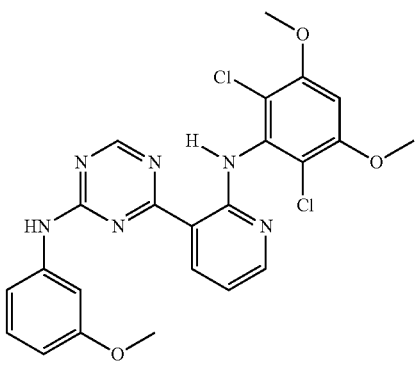 [SMILES: COc1cccc(Nc2ncnc(-c3cccnc3Nc3c(Cl)c(OC)cc(OC)c3Cl)n2)c1]

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 3-methoxyaniline. $^1$H NMR (400 MHz, CDCl$_3$) δ 10.98 (s, 1H), 8.84 (dd, J=7.6, 1.6 Hz, 1H), 8.78 (s, 1H), 8.27 (dd, J=4.8, 1.6 Hz, 1H), 7.38 (s, 1H), 7.22 (m, 2H), 7.11 (m, 1H), 6.80 (dd, J=7.6, 4.8 Hz, 1H), 6.67 (m, 1H), 6.54 (s, 1H), 3.95 (s, 6H), 3.79 (s, 3H). MS m/z: 499 [M+H]$^+$.

Example 7: N$^1$-(4-(2-((2,6-dichloro-3,5-dimethoxyphenyl)amino)pyridin-3-yl)-1,3,5-triazin-2-yl)-N$^4$,N$^4$-dimethylbenzene-1,4-diamine (Compound No. 7)

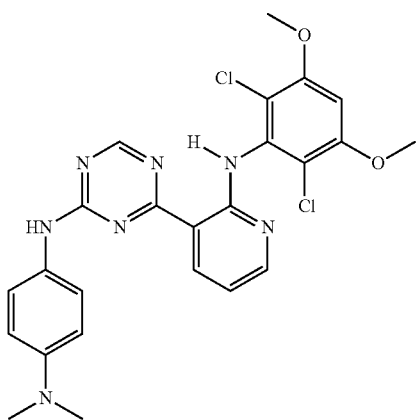 [SMILES: COc1cc(OC)c(Cl)c(Nc2ncccc2-c2ncnc(Nc3ccc(N(C)C)cc3)n2)c1Cl]

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and N$^1$,N$^1$-dimethylbenzene-1,4-diamine. $^1$H NMR (400 MHz, CDCl$_3$) δ 10.72 (s, 1H), 8.82 (dd, J=8.0, 2.0 Hz, 1H), 8.69 (s, 1H), 8.2 (dd, J=4.8, 2.0 Hz, 1H), 7.29 (m, 2H), 7.05 (s, 1H), 6.75 (dd, J=8.0, 4.8 Hz, 1H), 6.54 (m, 2H), 6.54 (s, 1H), 3.94 (s, 6H), 2.83 (s, 6H). MS m/z: 512 [M+H]$^+$.

Example 8: 4-(2-((2-((2,6-dichloro-3,5-dimethoxyphenyl)amino)pyridin-3-yl)-N-(3-(4-ethylpiperazin-1-yl)phenyl)-1,3,5-triazin-2-amine (Compound No. 8)

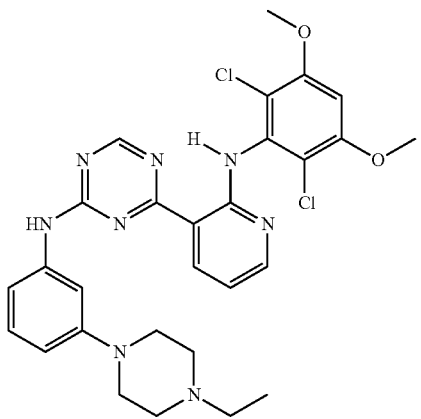 [SMILES: CCN1CCN(c2cccc(Nc3ncnc(-c4cccnc4Nc4c(Cl)c(OC)cc(OC)c4Cl)n3)c2)CC1]

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 3-(4-ethylpiperazin-1-yl)aniline. $^1$H NMR (400 MHz, CDCl$_3$) δ 10.98 (s, 1H), 8.83 (dd, J=7.8, 2.0 Hz, 1H), 8.76 (s, 1H), 8.26 (dd, J=4.6, 2.0 Hz, 1H), 7.29 (s, 1H), 7.23 (s, 1H), 7.18 (brs, 1H), 7.01 (brs, 1H), 6.78 (dd, J=7.8, 4.6 Hz, 1H), 6.69 (m, 1H), 6.54 (s, 1H), 3.95 (s, 6H), 3.25 (m, 4H), 2.62 (m, 4H), 2.50 (q, J=7.2 Hz, 2H), 1.15 (t, J=7.2 Hz, 3H). MS m/z: 581 [M+H]$^+$.

Example 9: 4-(2-((2-((2,6-dichloro-3,5-dimethoxyphenyl)amino)pyridin-3-yl)-N-(4-morpholinophenyl)-1,3,5-triazin-2-amine (Compound No. 9)

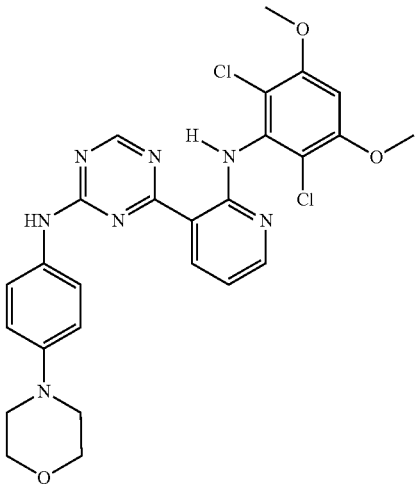 [SMILES: COc1cc(OC)c(Cl)c(Nc2ncccc2-c2ncnc(Nc3ccc(N4CCOCC4)cc3)n2)c1Cl]

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 4-morpholinoaniline. $^1$H NMR (400 MHz, CDCl$_3$) δ 10.69 (s, 1H), 8.83 (dd, J=8.0, 2.0 Hz, 1H), 8.72 (s, 1H), 8.22 (dd, J=4.8, 2.0 Hz, 1H), 7.37 (d, J=7.6 Hz, 2H), 7.07 (s, 1H), 6.78 (d, J=7.6 Hz, 2H), 6.75 (dd, J=8.0, 4.8 Hz, 1H), 6.56 (s, 1H), 3.94 (s, 6H), 3.83-3.81 (m, 4H), 3.00 (m, 4H). MS m/z: 554 [M+H]$^+$.

Example 10: 4-(2-((2-((2,6-dichloro-3,5-dimethoxyphenyl)amino)pyridin-3-yl)-N-(6-morpholinopyridin-3-yl)-1,3,5-triazin-2-amine (Compound No. 10)

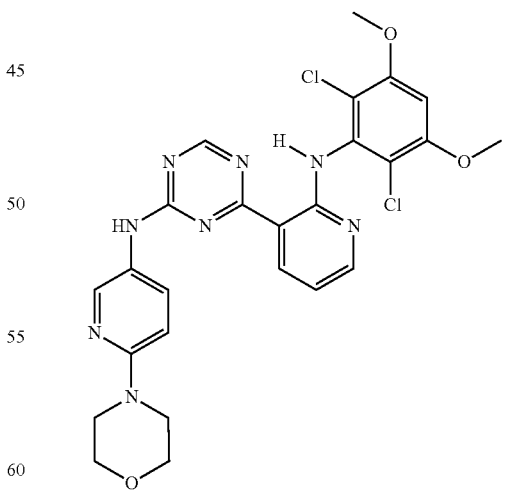

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 6-morpholinopyridin-3-amine. $^1$H NMR (400 MHz, CDCl$_3$) δ 10.63 (brs, 1H), 8.81 (dd, J=7.8, 1.8 Hz, 1H), 8.73

(s, 1H), 8.25 (s, 1H), 8.24 (dd, J=4.8, 1.8 Hz, 1H), 7.70 (brs, 1H), 7.19 (s, 1H), 6.77 (dd, J=7.8, 4.8 Hz, 1H), 6.54 (s, 1H), 6.48 (brs, 1H), 3.94 (s, 6H), 3.79 (m, 4H), 3.49-3.34 (m, 4H). MS m/z: 555 [M+H]+.

Example 11: 1-(4-(4-((4-(2-((2,6-dichloro-3,5-dimethoxyphenyl)amino)pyridin-3-yl)-1,3,5-triazin-2-yl)amino)phenyl)piperazin-1-yl)ethan-1-one (Compound No. 11)

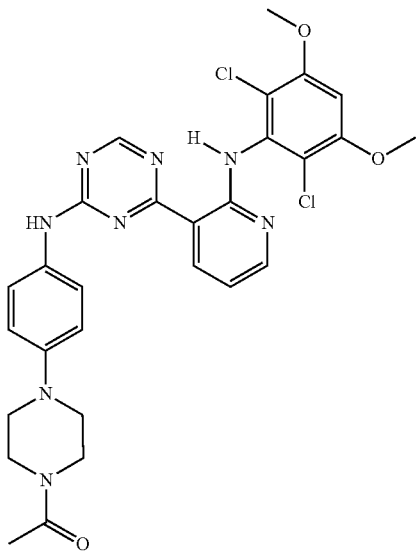 [SMILES: COc1cc(OC)c(Cl)c(Nc2ncccc2-c2ncnc(Nc3ccc(N4CCN(C(C)=O)CC4)cc3)n2)c1Cl]

The target compound was obtained in the same manner as in Example 9 using 3-(4-chloro-1,3,5-triazin-2-yl)-N-(2,6-dichloro-3,5-dimethoxyphenyl)pyridin-2-amine and 1-(4-(4-aminophenyl)piperazin-1-yl)ethan-1-one. 1H NMR (400 MHz, CDCl3) δ 10.62 (brs, 1H), 8.84 (dd, J=7.8, 1.6 Hz, 1H), 8.72 (s, 1H), 8.23 (dd, J=4.6, 1.6 Hz, 1H), 7.38 (brs, 2H), 7.18 (s, 1H), 6.77 (brs, 2H), 6.76 (dd, J=7.8, 4.6 Hz, 1H), 6.55 (s, 1H), 3.94 (s, 6H), 3.74-3.59 (m, 4H), 3.06-2.88 (m, 4H), 2.15 (s, 3H). MS m/z: 595 [M+H]+.

Example 12: 1-(4-((4-(2-((2,6-dichloro-3,5-dimethoxyphenyl)amino)pyridin-3-yl)-1,3,5-triazin-2-yl)amino)phenyl)piperidin-4-ol (Compound No. 12)

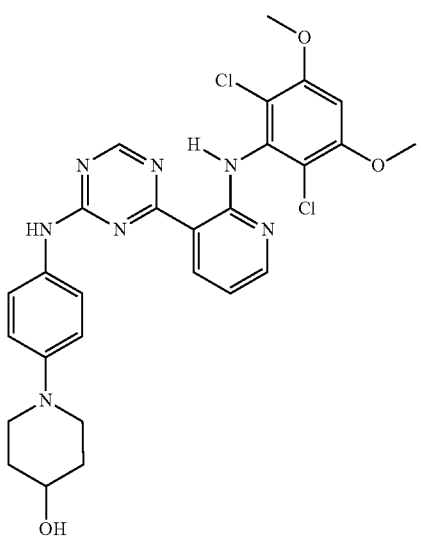 [SMILES: COc1cc(OC)c(Cl)c(Nc2ncccc2-c2ncnc(Nc3ccc(N4CCC(O)CC4)cc3)n2)c1Cl]

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 1-(4-aminophenyl)piperidin-4-ol. 1H NMR (400 MHz, CDCl3) δ 10.75 (brs, 1H), 8.83 (dd, J=7.8, 2.0 Hz, 1H), 8.71 (s, 1H), 8.22 (dd, J=4.6, 2.0 Hz, 1H), 7.36 (brs, 1H), 7.09 (s, 1H), 6.80 (brs, 2H), 6.76 (dd, J=7.8, 4.6 Hz, 1H), 6.56 (s, 1H), 3.94 (s, 6H), 3.84 (m, 1H), 3.38 (m, 2H), 2.82 (m, 2H), 1.99-1.97 (m, 2H), 1.69-1.65 (m, 2H). MS m/z: 568 [M+H]+.

Example 13: 4-(2-((2-((2,6-dichloro-3,5-dimethoxyphenyl)amino)pyridin-3-yl)-N-(4-((3S,5R)-3,5-dimethylpiperazin-1-yl)phenyl)-1,3,5-triazin-2-amine (Compound No. 13)

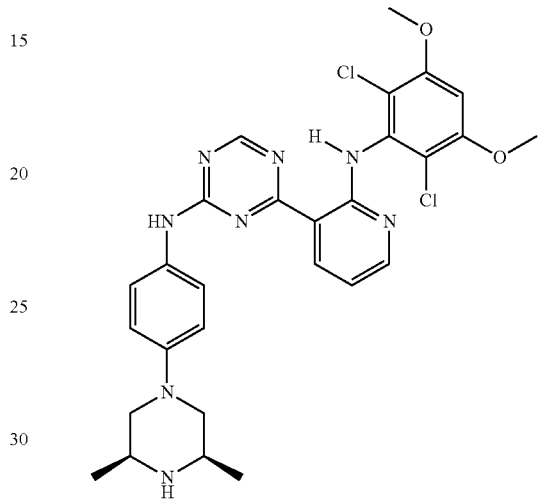

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 4-((3S,5R)-3,5-dimethylpiperazin-1-yl)aniline. 1H NMR (400 MHz, CDCl3) δ 10.76 (brs, 1H), 8.82 (dd, J=7.8, 1.8 Hz, 1H), 8.71 (s, 1H), 8.23 (dd, J=4.6, 1.8 Hz, 1H), 7.35 (brs, 2H), 7.17 (s, 1H), 6.78 (brs, 2H), 6.76 (dd, J=7.8, 4.6 Hz, 1H), 6.54 (s, 1H), 3.94 (s, 6H), 3.35 (m, 2H), 3.00 (m, 2H), 2.12 (m, 2H), 1.14 (d, J=6.4 Hz, 6H). MS m/z: 581 [M+H]+.

Example 14: 4-(2-((2-((2,6-dichloro-3,5-dimethoxyphenyl)amino)pyridin-3-yl)-N-(2-methoxy-4-(4-methylpiperazin-1-yl)phenyl)-1,3,5-triazin-2-amine (Compound No. 14)

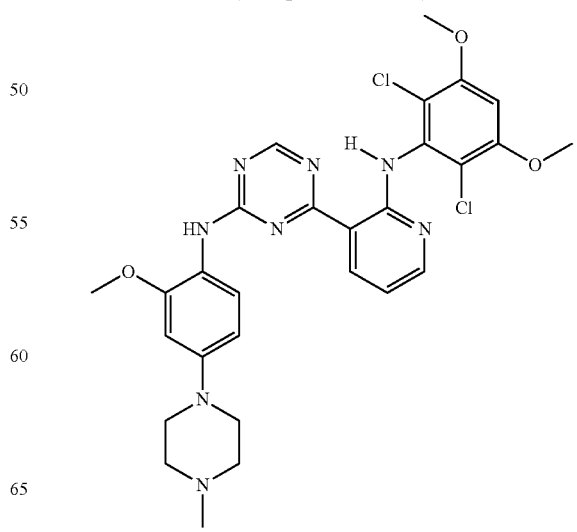

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 2-methoxy-4-(4-methylpiperazin-1-yl)aniline. $^1$H NMR (400 MHz, CDCl$_3$) δ 10.87 (brs, 1H), 8.83 (dd, J=7.8, 1.8 Hz, 1H), 8.71 (s, 1H), 8.24 (dd, J=4.6, 1.8 Hz, 1H), 7.84 (brs, 1H), 7.43 (brs, 1H), 6.78 (dd, J=7.8, 4.6 Hz, 1H), 6.54 (s, 1H), 6.47 (brs, 1H), 6.34 (brs, 1H), 3.94 (s, 6H), 3.86 (s, 3H), 3.07 (m, 4H), 2.56 (m, 4H), 2.36 (s, 3H). MS m/z: 597 [M+H]$^+$.

Example 15: 4-(2-((2-((2,6-dichloro-3,5-dimethoxyphenyl)amino)pyridin-3-yl)-N-(2-methoxy-4-morpholinophenyl)-1,3,5-triazin-2-amine (Compound No. 15)

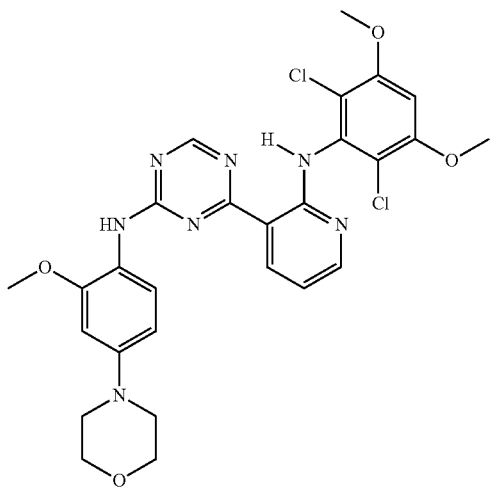

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 2-methoxy-4-morpholinoaniline. $^1$H NMR (400 MHz, CDCl$_3$) δ 10.79 (brs, 1H), 8.84 (dd, J=7.6, 1.6 Hz, 1H), 8.73 (s, 1H), 8.24 (dd, J=4.8, 1.6 Hz, 1H), 7.78 (brs, 1H), 7.30 (brs, 1H), 6.78 (dd, J=7.8, 4.8 Hz, 1H), 6.55 (s, 1H), 6.45 (brs, 1H), 6.30 (brs, 1H), 3.95 (s, 6H), 3.85 (s, 3H), 3.86-3.84 (m, 4H), 2.99 (m, 4H). MS m/z: 584 [M+H]$^+$.

Example 16: 4-(2-((2-((2,6-dichloro-3,5-dimethoxyphenyl)amino)pyridin-3-yl)-N-(2-methoxy-6-morpholinopyridin-3-yl)-1,3,5-triazin-2-amine (Compound No. 16)

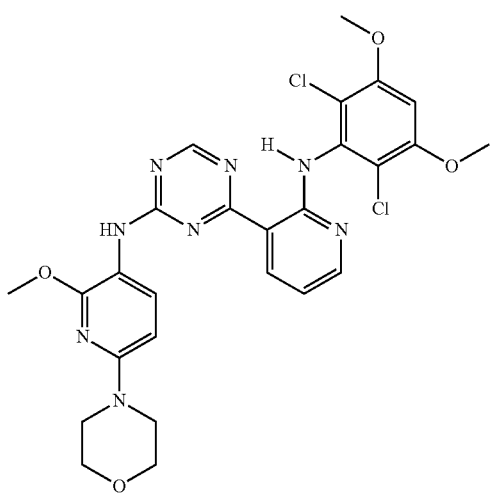

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 2-methoxy-6-morpholinopyridin-3-amine. $^1$H NMR (400 MHz, CDCl$_3$) δ 10.76 (brs, 1H), 8.81 (dd, J=8.0, 2.0 Hz, 1H), 8.71 (s, 1H), 8.24 (dd, J=4.8, 2.0 Hz, 1H), 7.96 (brs, 1H), 7.15 (brs, 1H), 6.78 (dd, J=8.0, 4.8 Hz, 1H), 6.55 (s, 1H), 5.99 (brs, 1H), 3.95 (s, 6H), 3.91 (s, 3H), 3.79 (m, 4H), 3.47-3.30 (m, 4H). MS m/z: 585 [M+H]$^+$.

Example 17: 4-(2-((2-((2,6-dichloro-3,5-dimethoxyphenyl)amino)pyridin-3-yl)-N-(4-((3S,5R)-3,5-dimethylpiperazin-1-yl)-2-methoxyphenyl)-1,3,5-triazin-2-amine (Compound No. 17)

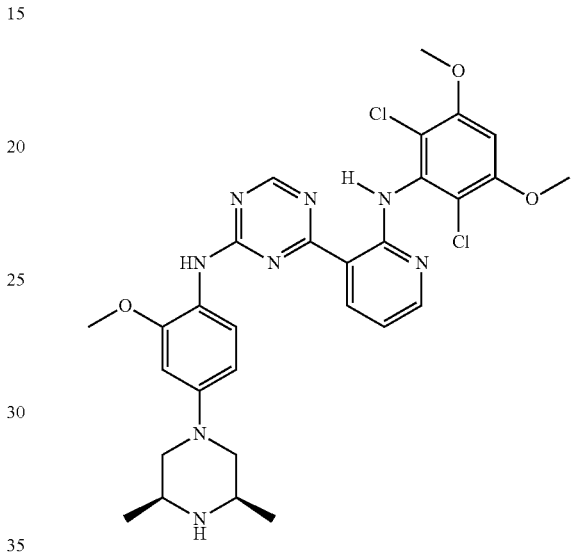

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 4-((3S,5R)-3,5-dimethylpiperazin-1-yl)-2-methoxyaniline. $^1$H NMR (400 MHz, CDCl$_3$) δ 10.89 (brs, 1H), 8.83 (dd, J=7.6, 1.6 Hz, 1H), 8.71 (s, 1H), 8.23 (dd, J=4.8, 1.6 Hz, 1H), 7.83 (brs, 1H), 7.40 (brs, 1H), 6.77 (dd, J=7.6, 4.8 Hz, 1H), 6.54 (s, 1H), 6.46 (brs, 1H), 6.32 (brs, 1H), 3.95 (s, 6H), 3.87 (s, 3H), 3.36-3.02 (m, 4H), 2.35-2.17 (m, 2H), 1.15 (d, J=6.4 Hz, 6H). MS m/z: 611 [M+H]$^+$.

Example 18: 4-(2-((2-((2,6-dichloro-3,5-dimethoxyphenyl)amino)pyridin-3-yl)-N-(1-methyl-1H-pyrazol-4-yl)-1,3,5-triazin-2-amine (Compound No. 18)

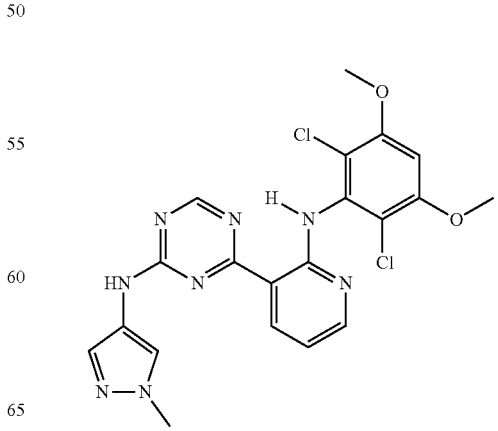

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 1-methyl-1H-pyrazol-4-amine. $^1$H NMR (400 MHz, CDCl$_3$) (mixture of rotamers) δ 11.10 (s, 0.5H), 10.98 (s, 0.5H), 8.84 (dd, J=7.6, 1.2 Hz, 1H), 8.81 (s, 0.5H), 8.71 (s, 0.5H), 8.28 (dd, J=4.4, 1.2 Hz, 1H), 7.88 (s, 0.5H), 7.66 (s, 0.5H), 7.54 (s, 1H), 7.21 (s, 0.5H), 7.09 (s, 0.5H), 6.82 (dd, J=7.6, 4.4 Hz, 1H), 6.56 (s, 0.5H), 6.55 (s, 0.5H), 3.95 (s, 6H), 3.93 (s, 1.5H), 3.72 (s, 1.5H). MS m/z: 473 [M+H]$^+$.

Example 19: N-(1-allyl-1H-pyrazol-4-yl)-4-(2-((2,6-dichloro-3,5-dimethoxyphenyl)amino)pyridin-3-yl)-1,3,5-triazin-2-amine (Compound No. 19)

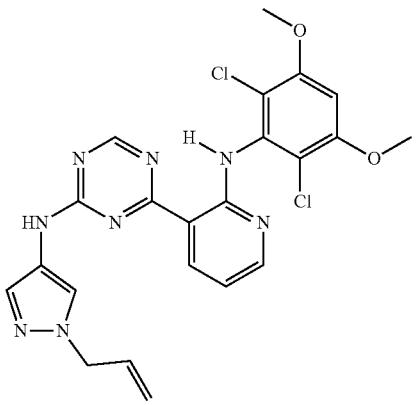 [SMILES: C=CCn1cc(Nc2ncnc(-c3cccnc3Nc3c(Cl)c(OC)cc(OC)c3Cl)n2)cn1]

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 1-allyl-1H-pyrazol-4-amine. $^1$H NMR (400 MHz, CDCl$_3$) (mixture of rotamers) δ 11.02 (s, 0.5H), 10.93 (s, 0.5H), 8.81 (s, 0.5H), 8.80 (dd, J=8.0, 1.6 Hz, 1H), 8.70 (s, 0.5H), 8.26 (dd, J=4.8, 1.6 Hz, 1H), 7.92 (s, 0.5H), 7.74 (s, 0.5H), 7.61 (s, 0.5H), 7.58 (s, 0.5H), 7.19 (s, 0.5H), 7.06 (s, 0.5H), 6.79 (dd, J=8.0, 4.8 Hz, 1H), 6.55 (s, 0.5H), 6.54 (s, 0.5H), 6.05 (m, 0.5H), 5.94 (m, 0.5H), 5.30 (m, 1H), 5.24 (m, 1H), 4.75 (m, 1H), 4.57 (m, 1H), 3.95 (s, 6H). MS m/z: 499 [M+H]$^+$.

Example 20: 4-(2-((2,6-dichloro-3,5-dimethoxyphenyl)amino)pyridin-3-yl)-N-(1-(3-(dimethylamino)propyl)-1H-pyrazol-4-yl)-1,3,5-triazin-2-amine (Compound No. 20)

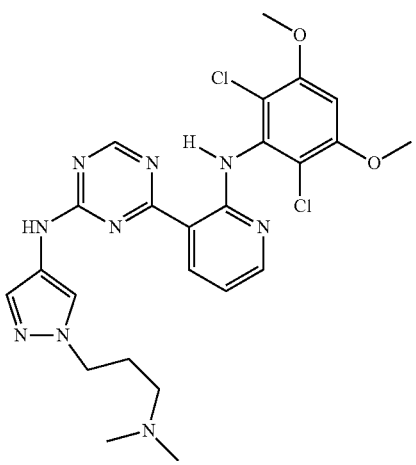 [SMILES: COc1cc(OC)c(Cl)c(Nc2ncccc2-c2ncnc(Nc3cnn(CCCN(C)C)c3)n2)c1Cl]

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 1-(3-(dimethylamino) propyl)-1H-pyrazol-4-amine. $^1$H NMR (400 MHz, CDCl$_3$) (mixture of rotamers) δ 11.02 (s, 0.5H), 10.94 (s, 0.5H), 8.80 (dd, J=8.0, 2.0 Hz, 1H), 8.80 (s, 0.5H), 8.70 (s, 0.5H), 8.26 (dd, J=4.2, 2.0 Hz, 1H), 7.93 (s, 0.5H), 7.74 (s, 0.5H), 7.60 (s, 0.5H), 7.57 (s, 0.5H), 7.14 (s, 0.5H), 7.04 (s, 0.5H), 6.80 (dd, J=8.0, 4.2 Hz, 1H), 6.55 (s, 0.5H), 6.54 (s, 0.5H), 4.19 (t, J=7.2 Hz, 1H), 4.02 (t, J=7.2 Hz, 1H), 3.95 (s, 6H), 2.32-2.17 (m, 2H), 2.25 (s, 3H), 2.24 (s, 3H), 2.08 (t, J=7.2 Hz, 1H), 1.96 (t, J=7.2 Hz, 1H). MS m/z: 544 [M+H]$^+$.

Example 21: 4-(2-((2,6-dichloro-3,5-dimethoxyphenyl)amino)pyridin-3-yl)-N-(1-(tetrahydro-2H-pyran-4-yl)-1H-pyrazol-4-yl)-1,3,5-triazin-2-amine (Compound No. 21)

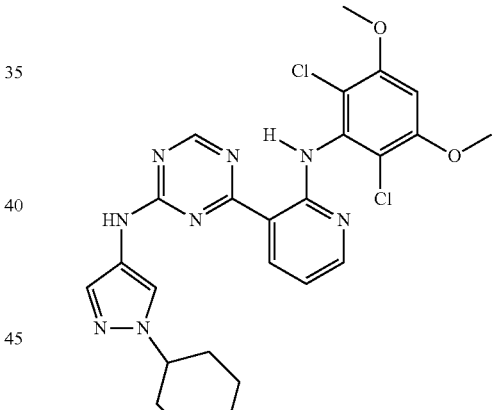

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 1-(tetrahydro-2H-pyran-4-yl)-1H-pyrazol-4-amine. $^1$H NMR (400 MHz, CDCl$_3$) (mixture of rotamers) δ 11.02 (s, 0.5H), 10.85 (s, 0.5H), 8.82 (dd, J=7.6, 2.0 Hz, 1H), 8.81 (s, 0.5H), 8.70 (s, 0.5H), 8.26 (dd, J=5.0, 2.0 Hz, 1H), 7.97 (s, 0.5H), 7.72 (s, 0.5H), 7.61 (s, 0.5H), 7.58 (s, 0.5H), 7.20 (s, 0.5H), 7.05 (s, 0.5H), 6.80 (dd, J=7.6, 5.0 Hz, 1H), 6.54 (s, 1H), 4.35 (m, 0.5H), 4.14-4.03 (m, 2H), 4.12 (m, 0.5H), 3.95 (s, 6H), 3.58-3.43 (m, 2H), 2.15-1.91 (m, 4H). MS m/z: 543 [M+H]$^+$.

Example 22: 4-(2-((2-((2,6-dichloro-3,5-dimethoxy-phenyl)amino)pyridin-3-yl)-N-(1-(1-isopropylpiperidin-4-yl)-1H-pyrazol-4-yl)-1,3,5-triazin-2-amine (Compound No. 22)

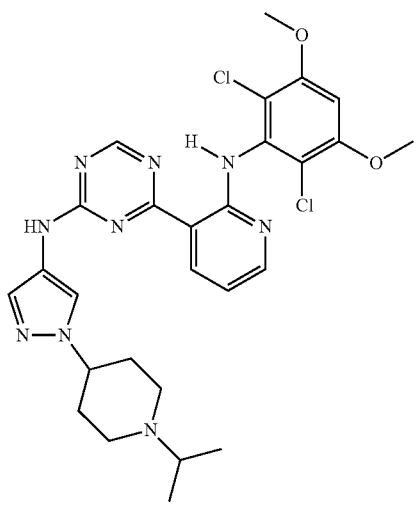 [SMILES: COc1cc(OC)c(Cl)c(Nc2ncccc2-c2ncnc(Nc3cnn(C4CCN(C(C)C)CC4)c3)n2)c1Cl]

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and 1-(1-isopropylpiperidin-4-yl)-1H-pyrazol-4-amine. $^1$H NMR (400 MHz, CDCl$_3$) (mixture of rotamers) δ 11.03 (s, 0.5H), 10.93 (s, 0.5H), 8.80 (dd, J=7.6, 2.0 Hz, 1H), 8.79 (s, 0.5H), 8.69 (s, 0.5H), 8.26 (dd, J=5.2, 2.0 Hz, 1H), 7.98 (s, 0.5H), 7.70 (s, 0.5H), 7.63 (s, 0.5H), 7.56 (s, 0.5H), 7.14 (s, 0.5H), 7.00 (s, 0.5H), 6.80 (dd, J=7.6, 5.2 Hz, 1H), 6.53 (s, 1H), 3.94 (s, 6H), 3.68 (m, 1H), 3.03-2.95 (m, 2H), 2.81-2.77 (m, 1H), 2.35-1.88 (m, 6H), 1.07 (d, J=6.4 Hz, 1H). MS m/z: 584 [M+H]$^+$.

Example 23: Tert-butyl 4-(4-((4-(2-((2,6-dichloro-3,5-dimethoxyphenyl)amino)pyridin-3-yl)-1,3,5-triazin-2-yl)amino)-1H-pyrazol-1-yl) piperidine-1-carboxylate (Compound No. 23)

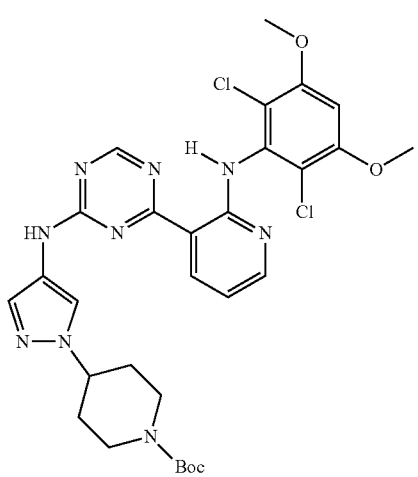 [SMILES: COc1cc(OC)c(Cl)c(Nc2ncccc2-c2ncnc(Nc3cnn(C4CCN(C(=O)OC(C)(C)C)CC4)c3)n2)c1Cl]

The target compound was obtained in the same manner as in Step 9 of Example 1 using 3-(4-chloro-1,3,5-triazin-2-yl)-N-(2,6-dichloro-3,5-dimethoxyphenyl)pyridin-2-amine and tert-butyl 4-(4-amino-1H-pyrazol-1-yl) piperidine-1-carboxylate. $^1$H NMR (400 MHz, CDCl$_3$) (mixture of rotamers) δ 11.01 (s, 0.5H), 10.84 (s, 0.5H), 8.82 (dd, J=8.4, 2.0 Hz, 1H), 8.81 (s, 0.5H), 8.70 (s, 0.5H), 8.26 (dd, J=4.8, 2.0 Hz, 1H), 7.95 (s, 0.5H), 7.70 (s, 0.5H), 7.61 (s, 0.5H), 7.57 (s, 0.5H), 7.25 (s, 0.5H), 7.05 (s, 0.5H), 6.79 (dd, J=8.4, 4.8 Hz, 1H), 6.54 (s, 0.5H), 6.53 (s, 0.5H), 4.30-4.10 (m, 2H), 4.20 (m, 0.5H), 4.00 (m, 0.5H), 3.94 (s, 6H), 2.95-2.70 (m, 2H), 2.20-1.90 (m, 4H), 1.48 (s, 9H). MS m/z: 642 [M+H]$^+$.

Example 24: 4-(2-((2,6-dichloro-3,5-dimethoxyphenyl)amino)pyridin-3-yl)-N-(1-(piperidin-4-yl)-1H-pyrazol-4-yl)-1,3,5-triazin-2-amine (Compound No. 24)

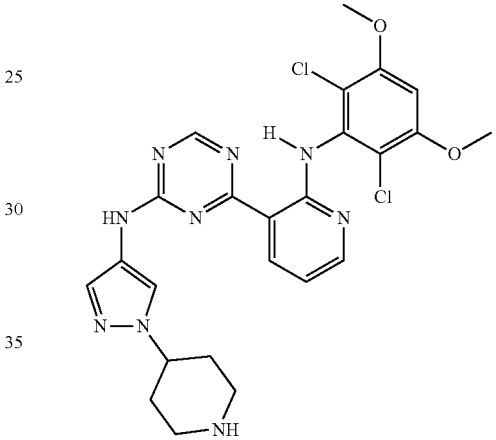

The target compound was obtained using tert-butyl 4-(4-((4-(2-((2,6-dichloro-3,5-dimethoxyphenyl)amino)pyridin-3-yl)-1,3,5-triazin-2-yl)amino)-1H-pyrazol-1-yl)piperidine-1-carboxylate and trifluoroacetic acid. $^1$H NMR (400 MHz, DMSO-d$_6$) (mixture of rotamers) δ 10.92 (s, 0.5H), 10.92 (s, 0.5H), 10.49 (s, 0.5H), 10.27 (s, 0.5H), 8.85 (s, 0.5H), 8.79 (s, 0.5H), 8.78 (dd, J=7.8, 1.8 Hz, 0.5H), 8.75 (dd, J=7.8, 1.8 Hz, 0.5H), 8.61 (brs, 1H), 8.37 (brs, 1H), 8.18 (dd, J=4.8, 1.8 Hz, 0.5H), 8.16 (dd, J=4.8, 1.8 Hz, 0.5H), 8.07 (s, 0.5H), 7.93 (s, 0.5H), 7.65 (s, 0.5H), 7.63 (s, 0.5H), 6.94 (s, 0.5H), 6.92 (dd, J=7.8, 4.8 Hz, 0.5H), 6.89 (s, 0.5H), 6.87 (dd, J=7.8, 4.8 Hz, 0.5H), 4.55-4.48 (m, 0.5H), 4.38-4.31 (m, 0.5H), 3.96 (s, 3H), 3.95 (s, 3H), 3.44-3.38 (m, 2H), 3.11-3.02 (m, 2H), 2.20-2.02 (m, 4H). MS m/z: 542 [M+H]$^+$.

Experimental Example

In the following experimental examples performed on 24 compounds (Compound Nos. 1 to 24) synthesized in Examples 1 to 24 of the present invention, analysis of inhibitory activity against protein kinase, analysis of inhibitory activity on cancer cell proliferation, evaluation of inhibitory activity against pan-FGFR mutation, evaluation of inhibitory activity against CYPs, evaluation of metabolic stability, analysis of in-vivo PK profile, and evaluation of in-vivo efficacy in an animal model transplanted with a bladder cancer cell line were performed to determine the efficacy and characteristics of the novel pyridinyl triazine derivative compounds according to the present invention.

Experimental Example 1: Measurement of Inhibitory Activity Against Protein Kinase In order to measure the inhibitory activity (%) against protein kinases of the compounds of the present invention, biochemical assays were performed on a full kinase panel composed of 369 kinases. The test compound used herein was 4-(2-((2-((2,6-dichloro-3,5-dimethoxyphenyl)amino)pyridin-3-yl)-N-(4-(4-ethylpiperazin-1-yl)phenyl)-1,3,5-triazin-2-amine of Example 1, which is a representative compound according to the present invention.

Table 1 below shows a list of kinases, the activity of which is inhibited by 90% or more by the compound of Example 1 when treated at a single concentration of 1 µM.

TABLE 1

| List of kinases having activity inhibited by 91% or more | |
|---|---|
| CDK4 | LCK |
| CDK6 | LYN |
| CLK2 | MAK |
| DDR1 | MPSK1 |
| FGFR1 | PCTAIRE1 |
| FGFR2 | PCTAIRE2 |
| FGFR3 | PHKg1 |
| FGFR4 | ROS |
| FMS | TAO2 |
| IRAK1 | TRKA |

As can be seen from the results of Table 1, the compounds of the present invention exhibit inhibitory activity against protein kinases, specifically CDK4, CDK6, CLK2, DDR1, FGFR1, FGFR2, FGFR3, FGFR4, FMS, IRAK1, LCK, LYN, MAK, MPSK1, PCTAIRE1, PCTAIRE2, PHKg1, ROS, TAO2, and TRKA. Therefore, the compounds of the present invention can be used as active ingredients in pharmaceutical compositions for preventing and treating diseases caused by abnormal cell growth, that is, cancer diseases.

Experimental Example 2: Evaluation of Inhibitory Activity Against Cancer Cell Proliferation $GI_{50}$, indicating the inhibitory activity of the compound of the present invention against proliferation of AN3-CA, a uterine cancer cell line, was calculated, and the results are shown in Table 2 below.

TABLE 2

| Test compound | Inhibitory activity against proliferation of AN3-CA ($GI_{50}$, µM) |
|---|---|
| Example 1 compound (Compound No. 1) | A |
| Example 2 compound (Compound No. 2) | A |
| Example 3 compound (Compound No. 3) | B |
| Example 4 compound (Compound No. 4) | A |
| Example 5 compound (Compound No. 5) | B |
| Example 6 compound (Compound No. 6) | A |

TABLE 2-continued

| Test compound | Inhibitory activity against proliferation of AN3-CA ($GI_{50}$, µM) |
|---|---|
| Example 7 compound (Compound No. 7) | A |
| Example 8 compound (Compound No. 8) | A |
| Example 9 compound (Compound No. 9) | B |
| Example 10 compound (Compound No. 10) | A |
| Example 11 compound (Compound No. 11) | A |
| Example 12 compound (Compound No. 12) | A |
| Example 13 compound (Compound No. 13) | A |
| Example 14 compound (Compound No. 14) | A |
| Example 15 compound (Compound No. 15) | C |
| Example 16 compound (Compound No. 16) | C |
| Example 17 compound (Compound No. 17) | A |
| Example 18 compound (Compound No. 18) | A |
| Example 19 compound (Compound No. 19) | C |
| Example 20 compound (Compound No. 20) | A |
| Example 21 compound (Compound No. 21) | A |
| Example 22 compound (Compound No. 22) | A |
| Example 23 compound (Compound No. 23) | A |
| Example 24 compound (Compound No. 24) | A |

The activity value was indicated on a scale having three possible values.

A: $GI_{50} < 1$ µM

B: $1$ µM $< GI_{50} < 10$ µM

C: $GI_{50} > 10$ µM

As can be seen from the results in Table 2, the compound of the present invention has inhibitory activity against the proliferation of AN3-CA, which is a uterine cancer cell line, and the effect thereof is remarkable. Therefore, it can be seen that the compound of the present invention can be useful as a therapeutic agent for cancer.

Experimental Example 3: Evaluation of Inhibitory Activity Against Pan-FGFR Mutant The inhibitory activity against pan-FGFR mutants of the compounds synthesized in Examples 1, 8, 13, 22, and 24 was measured, the inhibitory activity on each of enzymatic activity and cellular activity was evaluated, and the results are shown in Tables 3 and 4 below.

TABLE 3

| Mutant enzyme (unit: nM) | FGFR1 mutant (V561M) | FGFR2 mutant (V564F) | FGFR2 mutant (N549H) | FGFR3 mutant (V555M) | FGFR3 mutant (K650M) | FGFR3 mutant (K650E) |
|---|---|---|---|---|---|---|
| Example 1 compound (Compound No. 1) | B | B | A | B | A | A |
| Example 8 compound (Compound No. 8) | B | B | A | B | A | A |
| Example 13 compound (Compound No. 13) | B | B | A | B | A | A |
| Example 22 compound (Compound No. 22) | A | B | A | A | A | A |
| Example 24 compound (Compound No. 24) | B | B | A | B | A | A |

The activity value was indicated on a scale having three possible values.
A: $IC_{50} < 100$ nM
B: $100$ nM $< IC_{50} < 1$ μM
C: $IC_{50} > 1$ μM As can be seen from the results in Table 3, the compounds of the present invention exhibit point mutant enzymatic activity against mutants of fibroblast growth factor receptors (FGFRs), specifically FGFR1 (V561M), FGFR2 (V564F, N549H), and FGFR3 (V555M, K650M, K650E), and the effect thereof is remarkable. Therefore, it can be seen that the compound of the present invention inhibits activation of FGFR, mutants and thus can be useful as a therapeutic agent for cancer.

TABLE 4

| Mutant cell (unit: μM) | UMUC3 (bladder cancer cell line) | AN3-CA (breast cancer cell line) | J82 (bladder cancer cell line) | KMS-11 (myeloma cell line) |
|---|---|---|---|---|
| Example 1 (Compound No. 1) | B | A | B | A |
| Example 8 (Compound No. 8) | B | A | B | A |
| Example 13 (Compound No. 13) | B | A | A | A |
| Example 22 (Compound No. 22) | A | A | A | A |
| Example 24 (Compound No. 24) | B | A | B | A |

The activity value was indicated on a scale having three possible values.
A: $GI_{50} < 1$ μM
B: $1$ μM $< GI_{50} < 10$ μM
C: $GI_{50} > 10$ μM As can be seen from the results in Table 4, the compound of the present invention can inhibit cellular activity of cancer cell lines, specifically, bladder cancer cell lines (UMUC3, J82), a breast cancer cell line (AN3-CA), and a myeloma cell line (KMS-11), and the effect thereof is remarkable. Therefore, it can be seen that the compound of the present invention can be useful as a therapeutic agent for a variety of kinds of cancer.

Experimental Example 4: Evaluation of Inhibitory Activity Against CYP Metabolic Enzyme In order to determine whether or not there is a possibility that the compounds synthesized in Examples 1, 22, and 24 of the present invention can cause side effects of drug interaction, the rate (%) of inhibition against 5 major metabolic enzymes (CYP1A2, CYP2C9, CYP2C$_{19}$, CYP2D6, and CYP3A4) among CYPs (cytochrome P450), which are enzymes involved in oxidative metabolism of drugs, was measured. The results are shown in Table 5 below and it can be seen that the compound of the present invention does not exhibit any inhibitory activity against three types of CYPs: CYP1A2, CYP2C$_8$ and CYP2D6. That is, it can be seen that the compound of the present invention has a low possibility of causing side effects of drug interaction.

TABLE 5

| Test item | CYP1A2 | CYP2C9 | CYP2C19 | CYP2D6 | CYP3A4 |
|---|---|---|---|---|---|
| Example 1 compound (Compound No. 1) | 71.4% | 70.2% | 26.7% | 80.9% | 17.0% |
| Example 22 compound (Compound No. 22) | 75.9 % | 79.1% | 44.6% | 81.0% | 17.6% |
| Example 24 compound (Compound No. 24) | 72.8% | 8 9.9 % | 51.0% | >100% | 44.1% |

Experimental Example 5: Evaluation of Microsomal Stability

The microsomal stability of the compounds synthesized in Examples 1, 22, and 24 of the present invention was evaluated using liver microsomes of humans, dogs, rats, and mice, and the results are shown in Table 6 below.

TABLE 6

| Test item | Human | Dog | Rat | Mouse |
| --- | --- | --- | --- | --- |
| Example 1 compound (Compound No. 1) | 44.0% | 33.2% | 37.6% | 36.8% |
| Example 22 compound (Compound No. 22) | 21.8% | 8.3% | 7.7% | 11.5% |
| Example 24 compound (Compound No. 24) | 62.6% | 66.9% | 65.4% | 62.1% |

As can be seen from the results in Table 6, with respect to the amount (hereinafter referred to as "remaining (%)") of the compound of the present invention left after reaction with the microsome based on the amount of a sample taken at 0 minutes, the amount remaining (%) of Compound No. 1 was 44% in humans, 33.2% in dogs, 37.6% in rats, and 36.8% in mice, the amount remaining (%) of Compound No. 22 was 21.8% in humans, 8.3% in dogs, 7.7% in rats, and 11.5% in mice, and the amount remaining (%) of Compound No. 24 was 62.6% in humans, 66.9% in dogs, 65.43 in rats, and 62.1 in mice. Therefore, it can be seen that the compound of the present invention is a metabolically stable drug.

Experimental Example 6: In-Vivo PK Profile

The results of in-vivo pharmacokinetic (PK) [mouse PK/ICR mice] profile analysis of the 4-(2-((2,6-dichloro-3,5-dimethoxyphenyl)amino)pyridin-3-yl)-N-(1-(piperidin-4-yl)-1H-pyrazol-4-yl)-1,3,5-triazin-2-amine (Compound No. 24) synthesized in Example 24 are shown in Table below.

TABLE 7

| | Mouse PK/ICR Mice | | | | | |
| --- | --- | --- | --- | --- | --- | --- |
| Dose | $t_{1/2}$ hr | $T_{max}$ hr | $C_{max}$ ng/mL | $AUC_{(0-t)}$ ng/mL · hr | $AUC_{(0-\infty)}$ ng/mL · hr | $MRT_{inf}$ hr |
| PO (orally administered) 10 mg/kg (mpk) | 4.83 | 0.42 | 153.33 | 750.85 | 397.41 | 7.94 |

As can be seen from the results shown in Table 7, when the compound of the present invention was orally administered to ICR mice at a dose of 10 mg/kg, the $AUC_{0-\infty}$ was 397.41 ng/mL·hr, the mean residence time (MRT) obtained therefrom was 7.94 hours, and the half-life ($t_{1/2}$) calculated therefrom was 4.83 hours. In addition, it can be seen that, when orally administered at a dose of 10 mg/kg, the maximum blood concentration ($C_{max}$) in the body at the time of maximum plasma concentration ($T_{max}$) is 153.33 ng/mL.

Experimental Example 7: Evaluation of In-Vivo Efficacy in Animal Model Transplanted with Bladder Cancer Cell Line In order to evaluate the in-vivo efficacy of 4-(2-((2,6-dichloro-3,5-dimethoxyphenyl)amino)pyridin-3-yl)-N-(4-(4-ethylpiperazin-1-yl)phenyl)-1,3,5-triazin-2-amine (Compound No. 1) synthesized in Example 1, the following test was performed.

Specifically, 6-7 week old BALB/C nude mice xenografted with UMUC3, which was a bladder cancer cell line overexpressing FGFR1, were used as an animal model. BGJ398 (manufactured by Novartis), a known FGFR inhibitor, was used as a control drug. A mixed solution (pH=4) of 5% N-methylpyrrolidinone (NMP), 6% Solutol, 20% polyethylene glycol (PEG400), and 69'% distilled water was used as a vehicle. At this time, the drug was orally administered at a concentration of 20 mpk (mg/kg) once a day.

As a result, as can be seen from the FIGURE, Compound No. 1 of the present invention, which is a novel pyridinyl triazine derivative, exhibited an excellent tumor volume reduction effect, i.e., an anticancer effect, in a bladder cancer animal model transplanted with a bladder cancer cell line, compared to BGJ398, the control drug known to be an FGFR inhibitor.

The above series of results demonstrated that the novel pyridinyl triazine derivative compound of the present invention has excellent ability to inhibit protein kinase activity, as well as superior inhibitory activity on proliferation of various cancer cells and excellent inhibitory activity on tumor growth, that is, anticancer efficacy, in cancer-inducing animal models. Accordingly, the pyridinyl triazine derivative compound according to the present invention can be useful as a pharmaceutical composition for preventing and treating diseases caused by abnormal cell growth, that is, tumor or cancer diseases.

Preparation Example

Meanwhile, the novel compound represented by Formula 1 according to the present invention can be formulated in various forms according to the purpose. Examples of some formulation methods including incorporating the compound represented by Formula 1 according to the present invention as an active ingredient are as follows, but the present invention is not limited thereto.

Preparation Example 1: Tablet (Direct Pressurization)

5.0 mg of the active ingredient was sieved, 14.1 mg of lactose, 0.8 mg of crospovidone USNF, and 0.1 mg of magnesium stearate were mixed therewith, and the mixture was pressurized into tablets.

Preparation Example 2: Tablet (Wet Granulation)

5.0 mg of the active ingredient was sieved and mixed with 16.0 mg of lactose and 4.0 mg of starch. 0.3 mg of Polysorbate 80 was dissolved in pure water, and an appropriate amount of the resulting solution was added to the resulting mixture, followed by granulation. The granules were dried, sieved, and mixed with 2.7 mg of colloidal silicon dioxide and 2.0 mg of magnesium stearate. The granules were pressed into tablets.

Preparation Example 3: Powders and Capsules 5.0 mg of the active ingredient was sieved and then mixed with 14.8 mg of lactose, 10.0 mg of polyvinylpyrrolidone, and 0.2 mg of magnesium stearate. Hard No. 5 gelatin capsules were filled with the resulting mixture.

Preparation Example 4: Injection

Injections were prepared by incorporating 100 mg of the active ingredient as well as 180 mg of mannitol, 26 mg of $Na_2HPO_4 \cdot 12H_2O$, and 2,974 mg of distilled water.

Although embodiments of the present invention have been described above, it will be obvious to those skilled in the art that the present invention can be implemented in other specific embodiments without changing the technical concepts or essential features of the present invention. Therefore, it should be construed that the aforementioned embodiments are illustrative and not restrictive in all respects.

INDUSTRIAL APPLICABILITY

As described above, the novel pyridinyl triazine derivative compound represented by Formula 1 according to the present invention or a pharmaceutically acceptable salt thereof exhibits inhibitory activity against protein kinases and thus can be used as a prophylactic and therapeutic agent for diseases caused by abnormal cell growth, for example, cancer diseases selected from the group consisting of endometrial cancer, bladder cancer, stomach cancer, lung cancer, liver cancer, colon cancer, small intestine cancer, pancreatic cancer, brain cancer, bone cancer, melanoma, breast cancer, sclerosing adenosis, head and neck cancer, esophageal cancer, thyroid cancer, parathyroid cancer, kidney cancer, sarcoma, prostate cancer, urethral cancer, leukemia, multiple myeloma, blood cancer such as myelodysplastic syndrome, lymphoma such as Hodgkin's disease and non-Hodgkin's lymphoma, and fibroadenoma.

The invention claimed is:

1. A compound selected from a pyridinyl triazine derivative compound represented by the following Formula 1, a pharmaceutically acceptable salt thereof, a hydrate thereof, a solvate thereof, and a stereoisomer thereof:

[Formula 1]

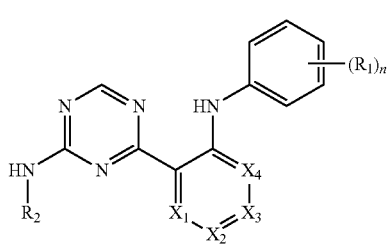

wherein
$X_1$, $X_2$, and $X_3$ are each CH;
$X_4$ is N;
n is 4, wherein the four groups of $R_1$ are Cl at the $2^{nd}$ position, Cl at the $6^{th}$ position, $OCH_3$ at the $3^{rd}$ position, and $OCH_3$ at the $5^{th}$ position,
$R_2$ is a halogen atom, a $C_1$-$C_{13}$ alkyl group, a $C_3$-$C_{10}$ cyclic group, a $C_3$-$C_{10}$ aryl group, or a $C_3$-$C_{10}$ heteroaryl group,
wherein the $C_1$-$C_{13}$ alkyl group or the $C_3$-$C_{10}$ cyclic group comprises at least one substituent selected from the group consisting of a hydroxy group, a halogen group, a $C_1$-$C_{13}$ alkyl group, a $C_1$-$C_6$ alkoxy group, an amino group (—$NR_3R_4$), a nitro group (—$N(O)_2$), an amide group (-(C=O)$NR_3R_4$), a carboxyl group (—C(O)OH), a nitrile group (—CN), a urea group (—$NR_3$(C=O)$NR_4$—), a sulfonamide group (—NHS(O)$_2$—), a sulfide group (—S—), a sulfone group (—S(O)$_2$—), a phosphinyl group (—P(O)$R_3R_4$), a $C_6$-$C_{10}$ aryl group, a $C_3$-$C_{10}$ heteroaryl group, and a $C_3$-$C_{10}$ heterocyclic group,
the $C_3$-$C_{10}$ aryl group or the $C_3$-$C_{10}$ heteroaryl group comprises at least one substituent selected from the group consisting of hydrogen, a hydroxy group, a halogen group, a carbonyl group (—(C=O)$R_3R_4$), a $C_1$-$C_3$ alkyl group substituted or unsubstituted with halogen or a $C_3$-$C_{10}$ heterocyclic group, a $C_1$-$C_3$ alkoxy group substituted or unsubstituted with halogen or a $C_3$-$C_{10}$ heterocyclic group, a $C_6$-$C_{10}$ phenoxy group, an amino group (—$NR_3R_4$), a nitro group (—$N(O)_2$), an amide group (—(C=O)$NR_3R_4$), a carboxyl group (—C(O)OH), a nitrile group (—CN), a urea group (—$NR_3$(C=O)$NR_4$—), a sulfonamide group (—NHS(O)$_2$—), a sulfide group (—S—), a sulfone group (—S(O)$_2$—), a phosphinyl group (—P(O)$R_3R_4$), a $C_6$-$C_{10}$ aryl group, a $C_3$-$C_{10}$ heteroaryl group, and a $C_3$-$C_{10}$ heterocyclic group,
$R_3$ and $R_4$ described above each independently comprise at least one selected from the group consisting of hydrogen, a $C_1$-$C_6$ alkyl group, a $C_1$-$C_6$ alkenyl group, a $C_1$-$C_6$ alkynyl group, a $C_6$-$C_{10}$ aryl group, a $C_3$-$C_{10}$ heteroaryl group, and a $C_3$-$C_{10}$ heterocyclic group,
the $C_3$-$C_{10}$ heteroaryl group contains at least one heteroatom selected from the group consisting of N, O, and S,
L is —NHC(O)— or —C(O)NH—,
Z comprises one to four substituents selected from $C_1$-$C_8$ alkyl, $C_1$-$C_8$ haloalkyl, 5-membered or 6-membered heteroaryl containing 1 to 3 nitrogen atoms, and 5-membered or 6-membered heterocycloalkyl containing 1 to 3 heteroatoms selected from nitrogen and oxygen atoms, wherein the heteroaryl or heterocycloalkyl is substituted or unsubstituted with $C_1$-$C_8$ alkyl.

2. The compound according to claim 1, wherein and $R_2$ is hydrogen, a methyl group, a substituted methyl group, a $C_3$-$C_6$ aryl group, or a $C_3$-$C_6$ heteroaryl group, wherein the substituted methyl group comprises at least one selected from the group consisting of a $C_1$-$C_6$ alkoxy group, an amino group (—$NR_3R_4$), a nitro group (—$N(O)_2$), an amide group (—(C=O)$NR_3R_4$), a carboxylic acid group (—C(O)OH), a nitrile group (—CN), a urea group (—$NR_3$(C=O)$NR_4$—), a sulfonamide group (—NHS(O)$_2$—), a sulfide group (—S—), a sulfone group (—S(O)$_2$—), a phosphinyl group (—P(O)$R_3R_4$), a $C_6$-$C_{10}$ aryl group, a $C_3$-$C_{10}$ heteroaryl group, and a $C_3$-$C_{10}$ heterocyclic group,
the $C_3$-$C_6$ aryl group or the $C_3$-$C_6$ heteroaryl group comprises at least one substituent selected from the group consisting of hydrogen, a hydroxy group, a halogen group, a carbonyl group (—(C=O)$R_3R_4$), a $C_1$-$C_3$ alkyl group substituted or unsubstituted with halogen or a $C_3$-$C_{10}$ heterocyclic group, a $C_1$-$C_3$ alkoxy group substituted or unsubstituted with halogen or a $C_3$-$C_{10}$ heterocyclic group, a $C_6$-$C_{10}$ phenoxy group, an amino group (—$NR_3R_4$), a nitro group (—$N(O)_2$), an amide group (—(C=O)$NR_3R_4$), a carboxyl group (—C(O)OH), a nitrile group (—CN), a urea group (—$NR_3$(C=O)$NR_4$—), a sulfonamide group (—NHS(O)$_2$—), a sulfide group (—S—), a sulfone group (—S(O)$_2$—),j a phosphinyl group (—P(O)R$_3$R$_4$), a C$_6$-C$_{10}$ aryl group, a C$_3$-C$_{10}$ heteroaryl group, and a C$_3$-C$_{10}$ heterocyclic group, R$_3$ and R$_4$ described above each independently comprise at least one selected from the group consisting of hydrogen, a C$_1$-C$_6$ alkyl group, a C$_1$-C$_6$ alkenyl group, a C$_1$-C$_6$ alkynyl group, a C$_6$-C$_{10}$ aryl group, a C$_3$-C$_{10}$ heteroaryl group, and a C$_3$-C$_{10}$ heterocyclic group, and the C$_3$-C$_6$ heteroaryl group contains at least one heteroatom selected from the group consisting of N, O, and S.

3. The compound according to claim 1, wherein R$_2$ is a hydrogen atom, a C$_1$-C$_8$ alkyl group, —(CH$_2$)$_m$—NR$^3$R$^4$, or -A-(CH$_2$)$_o$-(Q)$_p$-R$^5$, A is a C$_6$-C$_{15}$ aryl group, a 5- or 6-membered heteroaryl group containing 1 to 3 nitrogen atoms, or a 5- or 6-membered heterocycloalkyl group containing 1 to 3 heteroatoms selected from a nitrogen atom and an oxygen atom, wherein the aryl group, heteroaryl group, or heterocycloalkyl group is substituted or unsubstituted with 1 to 3 substituents selected from C$_1$-C$_8$ alkyl, C$_1$-C$_8$ alkoxy, C$_1$-C$_8$ haloalkyl, and C$_1$-C$_8$ alkoxycarbonyl, Q is a 5- or 6-membered heterocycloalkyl group or a biheterocycloalkyl group containing 1 to 3 heteroatoms selected from a nitrogen atom and an oxygen atom, R$^3$ and R$^4$ each independently comprise at least one selected from the group consisting of hydrogen, a C$_1$-C$_6$ alkyl group, a C$_1$-C$_6$ alkenyl group, a C$_1$-C$_6$ alkynyl group, a C$_6$-C$_{10}$ aryl group, a C$_3$-C$_{10}$ heteroaryl group, and a C$_3$-C$_{10}$ heterocyclyl group, R$^5$ is a hydrogen atom, C(O)OR$^7$ (wherein R$^7$ is a hydrogen atom or a C$_1$-C$_8$ alkyl group), or a C$_1$-C$_8$ alkyl group, m is an integer from 1 to 6, is an integer from 0 to 6, and p is 0 or 1.

4. The compound according to claim 3, wherein R$^2$ is a hydrogen atom, a methyl group, an ethyl group, a cyclopropyl group, a 2-(dimethylamino)ethyl group, a 3-(dimethylamino) propyl group, a phenyl group, a methoxy-substituted phenyl group, a trifluoromethyl-substituted phenyl group, a methoxy- or methoxycarbonyl-substituted phenyl group, a pyridinyl group, a pyrimidinyl group, a 4-methylpiperidin-1-yl group, or a 4-ethylpiperidin-1-yl group.

5. The compound according to claim 1, wherein the pharmaceutically acceptable salt is a salt of an inorganic acid or organic acid selected from the group consisting of hydrochloric acid, hydrobromic acid, sulfuric acid, phosphoric acid, nitric acid, acetic acid, glycolic acid, lactic acid, pyruvic acid, malonic acid, succinic acid, glutaric acid, fumaric acid, malic acid, mandelic acid, tartaric acid, citric acid, ascorbic acid, palmitic acid, maleic acid, hydroxymaleic acid, benzoic acid, hydroxybenzoic acid, phenylacetic acid, cinnamic acid, salicylic acid, methanesulfonic acid, benzenesulfonic acid, and toluenesulfonic acid.

6. A compound selected from a pyridinyl triazine derivative compound represented by the following Formula 1, a pharmaceutically acceptable salt thereof, a hydrate thereof, a solvate thereof, and a stereoisomer thereof:

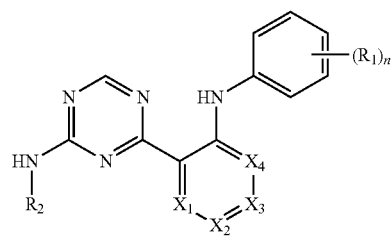

[Formula 1]

wherein

X$_1$, X$_2$, and X$_3$ are each independently N or CH;

X$_4$ is N;

n is an integer from 4 to 6, wherein R$^1$ is each independently selected from a halogen atom, a C$_1$-C$_8$ alkyl group, a C$_1$-C$_8$ alkoxy group and

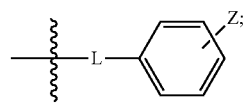

R$_2$ is a hydrogen atom, a C$_1$-C$_8$ alkyl group, —(CH$_2$)$_m$—NR$^3$R$^4$, or -A-(CH$_2$)$_o$-(Q)$_p$-R$^5$, A is a C$_6$-C$_{15}$ aryl group, a 5- or 6-membered heteroaryl group containing 1 to 3 nitrogen atoms, or a 5- or 6-membered heterocycloalkyl group containing 1 to 3 heteroatoms selected from a nitrogen atom and an oxygen atom, wherein the aryl group, heteroaryl group, or heterocycloalkyl group is substituted or unsubstituted with 1 to 3 substituents selected from C$_1$-C$_8$ alkyl, C$_1$-C$_8$ alkoxy, C$_1$-C$_8$ haloalkyl, and C$_1$-C$_8$ alkoxycarbonyl, Q is a 5- or 6-membered heterocycloalkyl group or a biheterocycloalkyl group containing 1 to 3 heteroatoms selected from a nitrogen atom and an oxygen atom, R$^3$ and R$^4$ each independently comprise at least one selected from the group consisting of hydrogen, a C$_1$-C$_6$ alkyl group, a C$_1$-C$_6$ alkenyl group, a C$_1$-C$_6$ alkynyl group, a C$_6$-C$_{10}$ aryl group, a C$_3$-C$_{10}$ heteroaryl group, and a C$_3$-C$_{10}$ heterocyclyl group, R$^5$ is a hydrogen atom, C(O)OR$^7$ (wherein R$^7$ is a hydrogen atom or a C$_1$-C$_8$ alkyl group), or a C$_1$-C$_8$ alkyl group, m is an integer from 1 to 6, is an integer from 0 to 6, and p is 0 or 1, wherein when R$_2$ is -A-(CH$_2$)$_o$-(Q)$_p$-R$^5$:

p is 1, is an integer from 0 to 6,

Q is a piperidinyl group, a bipiperidinyl group, a piperazinyl group, or a morpholino group, and R$^5$ is a hydrogen atom, a methyl group, an ethyl group, a cyclohexylmethyl group, or a methoxycarbonyl group, wherein the C$_1$-C$_8$ alkyl group comprises at least one substituent selected from the group consisting of a hydroxy group, a halogen group, a C$_1$-C$_{13}$ alkyl group, a C$_1$-C$_6$ alkoxy group, an amino group (—NR$_3$R$_4$), a nitro group (—N(O)$_2$), an amide group (—(C=O)NR$_3$R$_4$), a carboxyl group (—C(O)OH), a nitrile group (—CN), a urea group (—NR$_3$(C=O)NR$_4$—), a sulfonamide group (—NHS(O)$_2$—), a sulfide group (—S—), a sulfone group (—S(O)$_2$—), a phosphinyl group (—P(O)R$_3$R$_4$), a C$_6$-C$_{10}$ aryl group, a C$_3$-C$_{10}$ heteroaryl group, and a C$_3$-C$_{10}$ heterocyclic group, L is —NHC(O)— or —C(O)NH—, Z comprises one to four substituents selected from C$_1$-C$_8$ alkyl, C$_1$-C$_8$ haloalkyl, 5-membered or 6-membered heteroaryl containing 1 to 3 nitrogen atoms, and 5-membered or 6-membered heterocycloalkyl containing 1 to 3 heteroatoms selected from nitrogen and oxygen atoms, wherein the heteroaryl or heterocycloalkyl is substituted or unsubstituted with C$_1$-C$_8$ alkyl.

7. The compound according to claim 6, wherein the pharmaceutically acceptable salt is a salt of an inorganic acid or organic acid selected from the group consisting of hydrochloric acid, hydrobromic acid, sulfuric acid, phosphoric acid, nitric acid, acetic acid, glycolic acid, lactic acid, pyruvic acid, malonic acid, succinic acid, glutaric acid, fumaric acid, malic acid, mandelic acid, tartaric acid, citric acid, ascorbic acid, palmitic acid, maleic acid, hydroxymaleic acid, benzoic acid, hydroxybenzoic acid, phenylacetic acid, cinnamic acid, salicylic acid, methanesulfonic acid, benzenesulfonic acid, and toluenesulfonic acid.

8. A pyridinyl triazine derivative compound, a pharmaceutically acceptable salt thereof, a hydrate thereof, a solvate thereof, and a stereoisomer thereof selected from the group consisting of the following compounds of Compound Nos. 1 to 24:

(Compound No. 1) 4-(2-((2-((2,6-dichloro-3,5-dimethoxyphenyl)amino) pyridin-3-yl)-N-(4-(4-ethylpiperazin-1-yl)phenyl)-1,3,5-triazin-2-amine;

(Compound No. 2) 4-(2-((2,6-dichloro-3,5-dimethoxyphenyl)amino) pyridin-3-yl)-1,3,5-triazin-2-amine;

(Compound No. 3) N$^1$-(4-(2-((2,6-dichloro-3,5-dimethoxyphenyl)amino) pyridin-3-yl)-1,3,5-triazin-2-yl)-N$^2$,N$^2$-dimethylethane-1,2-diamine;

(Compound No. 4) 4-(2-((2,6-dichloro-3,5-dimethoxyphenyl)amino) pyridin-3-yl)-N-phenyl-1,3,5-triazin-2-amine;

(Compound No. 5) 4-(2-((2-((2,6-dichloro-3,5-dimethoxyphenyl)amino) pyridin-3-yl)-N-(2-methoxyphenyl)-1,3,5-triazin-2-amine;

(Compound No. 6) 4-(2-((2-((2,6-dichloro-3,5-dimethoxyphenyl)amino) pyridin-3-yl)-N-(3-methoxyphenyl)-1,3,5-triazin-2-amine;

(Compound No. 7) N$^1$-(4-(2-((2,6-dichloro-3,5-dimethoxyphenyl)amino) pyridin-3-yl)-1,3,5-triazin-2-yl)-N$^4$,N$^4$-dimethylbenzene-1,4-diamine;

(Compound No. 8) 4-(2-((2-((2,6-dichloro-3,5-dimethoxyphenyl)amino) pyridin-3-yl)-N-(3-(4-ethylpiperazin-1-yl)phenyl)-1,3,5-triazin-2-amine;

(Compound No. 9) 4-(2-((2-((2,6-dichloro-3,5-dimethoxyphenyl)amino) pyridin-3-yl)-N-(4-morpholinophenyl)-1,3,5-triazin-2-amine;

(Compound No. 10) 4-(2-((2-((2,6-dichloro-3,5-dimethoxyphenyl)amino) pyridin-3-yl)-N-(6-morpholinopyridin-3-yl)-1,3,5-triazin-2-amine;

(Compound No. 11) 1-(4-(4-((4-(2-((2,6-dichloro-3,5-dimethoxyphenyl)amino) pyridin-3-yl)-1,3,5-triazin-2-yl)amino) phenyl) piperazin-1-yl) ethan-1-one;

(Compound No. 12) 1-(4-((4-(2-((2-((2,6-dichloro-3,5-dimethoxyphenyl)amino) pyridin-3-yl)-1,3,5-triazin-2-yl)amino) phenyl) piperidin-4-ol;

(Compound No. 13) 4-(2-((2-((2,6-dichloro-3,5-dimethoxyphenyl)amino) pyridin-3-yl)-N-(4-((3S,5R)-3,5-dimethylpiperazin-1-yl)phenyl)-1,3,5-triazin-2-amine;

(Compound No. 14) 4-(2-((2-((2,6-dichloro-3,5-dimethoxyphenyl)amino) pyridin-3-yl)-N-(2-methoxy-4-(4-methylpiperazin-1-yl)phenyl)-1,3,5-triazin-2-amine;

(Compound No. 15) 4-(2-((2-((2,6-dichloro-3,5-dimethoxyphenyl)amino) pyridin-3-yl)-N-(2-methoxy-4-morpholinophenyl)-1,3,5-triazin-2-amine;

(Compound No. 16) 4-(2-((2-((2,6-dichloro-3,5-dimethoxyphenyl)amino) pyridin-3-yl)-N-(2-methoxy-6-morpholinopyridin-3-yl)-1,3,5-triazin-2-amine;

(Compound No. 17) 4-(2-((2-((2,6-dichloro-3,5-dimethoxyphenyl)amino) pyridin-3-yl)-N-(4-((3S,5R)-3,5-dimethylpiperazin-1-yl)-2-methoxyphenyl)-1,3,5-triazin-2-amine;

(Compound No. 18) 4-(2-((2-((2,6-dichloro-3,5-dimethoxyphenyl)amino) pyridin-3-yl)-N-(1-methyl-1H-pyrazol-4-yl)-1,3,5-triazin-2-amine;

(Compound No. 19) N-(1-allyl-1H-pyrazol-4-yl)-4-(2-((2,6-dichloro-3,5-dimethoxyphenyl)amino) pyridin-3-yl)-1,3,5-triazin-2-amine;

(Compound No. 20) 4-(2-((2,6-dichloro-3,5-dimethoxyphenyl)amino) pyridin-3-yl)-N-(1-(3-(dimethylamino) propyl)-1H-pyrazol-4-yl)-1,3,5-triazin-2-amine;

(Compound No. 21) 4-(2-((2,6-dichloro-3,5-dimethoxyphenyl)amino) pyridin-3-yl)-N-(1-(tetrahydro-2H-pyran-4-yl)-1H-pyrazol-4-yl)-1,3,5-triazin-2-amine;

(Compound No. 22) 4-(2-((2-((2,6-dichloro-3,5-dimethoxyphenyl)amino) pyridin-3-yl)-N-(1-(1-isopropylpiperidin-4-yl)-1H-pyrazol-4-yl)-1,3,5-triazin-2-amine;

(Compound No. 23) tert-butyl 4-(4-((4-(2-((2,6-dichloro-3,5-dimethoxyphenyl)amino) pyridin-3-yl)-1,3,5-triazin-2-yl)amino)-1H-pyrazol-1-yl) piperidine-1-carboxylate; and (Compound No. 24) 4-(2-((2,6-dichloro-3,5-dimethoxyphenyl)amino) pyridin-3-yl)-N-(1-(piperidin-4-yl)-1H-pyrazol-4-yl)-1,3,5-triazin-2-amine.

9. The compound according to claim 8, wherein the pharmaceutically acceptable salt is a salt of an inorganic acid or organic acid selected from the group consisting of hydrochloric acid, hydrobromic acid, sulfuric acid, phosphoric acid, nitric acid, acetic acid, glycolic acid, lactic acid, pyruvic acid, malonic acid, succinic acid, glutaric acid, fumaric acid, malic acid, mandelic acid, tartaric acid, citric acid, ascorbic acid, palmitic acid, maleic acid, hydroxymaleic acid, benzoic acid, hydroxybenzoic acid, phenylacetic acid, cinnamic acid, salicylic acid, methanesulfonic acid, benzenesulfonic acid, and toluenesulfonic acid.

* * * * *